US 11,991,284 B1

(12) United States Patent
Ghabel

(10) Patent No.: US 11,991,284 B1
(45) Date of Patent: May 21, 2024

(54) BLOCKCHAIN-BASED AUTHENTICATION SYSTEM AND METHOD

(71) Applicant: Steven Ali Ghabel, Miami, FL (US)

(72) Inventor: Steven Ali Ghabel, Miami, FL (US)

(*) Notice: Subject to any disclaimer, the term of this patent is extended or adjusted under 35 U.S.C. 154(b) by 32 days.

(21) Appl. No.: 17/326,205

(22) Filed: May 20, 2021

Related U.S. Application Data

(60) Provisional application No. 63/047,857, filed on Jul. 2, 2020.

(51) Int. Cl.
| | |
|---|---|
| *H04L 9/30* | (2006.01) |
| *G06K 19/06* | (2006.01) |
| *H04L 9/08* | (2006.01) |
| *H04L 9/40* | (2022.01) |
| *H04L 9/00* | (2022.01) |

(52) U.S. Cl.
CPC ...... *H04L 9/3073* (2013.01); *G06K 19/06037* (2013.01); *H04L 9/0866* (2013.01); *H04L 63/123* (2013.01); *H04L 9/50* (2022.05)

(58) Field of Classification Search
CPC ... H04L 9/3073; H04L 9/0866; H04L 63/123; H04L 2209/38; H04L 9/32; G06K 19/06037
See application file for complete search history.

(56) References Cited

U.S. PATENT DOCUMENTS

| | | | |
|---|---|---|---|
| 8,065,202 B1 * | 11/2011 | Ballaro | G06Q 30/0643 705/27.2 |
| 8,856,533 B2 | 10/2014 | Schrijen et al. | |
| 9,641,342 B2 | 5/2017 | Sriram et al. | |
| 9,697,298 B2 * | 7/2017 | Rosati | G06F 16/9566 |
| 9,858,569 B2 | 1/2018 | Phan et al. | |
| 9,940,444 B1 | 4/2018 | Murphy et al. | |
| 10,193,695 B1 | 1/2019 | Endress et al. | |
| 10,275,739 B2 | 4/2019 | Hanis et al. | |
| 10,318,779 B2 | 6/2019 | Raynesford | |
| 10,361,849 B2 | 7/2019 | Smith et al. | |
| 10,498,808 B2 | 12/2019 | Purushothaman et al. | |
| 10,523,443 B1 | 12/2019 | Kleinman | |
| 10,547,446 B2 | 1/2020 | Sriram et al. | |
| 10,572,855 B1 * | 2/2020 | Levy | G06K 19/0723 |
| 11,037,227 B1 * | 6/2021 | Padilha | G06F 21/602 |
| 11,170,376 B2 * | 11/2021 | Kavali | G06Q 20/02 |
| 11,271,729 B2 * | 3/2022 | Covaci | H04L 9/14 |
| 11,315,112 B2 * | 4/2022 | Lu | G06Q 50/18 |
| 11,522,700 B1 * | 12/2022 | Auerbach | G06Q 20/401 |

(Continued)

FOREIGN PATENT DOCUMENTS

| | | |
|---|---|---|
| WO | 2019/062530 A1 | 4/2019 |
| WO | 2019/100872 A1 | 5/2019 |

*Primary Examiner* — Saleh Najjar
*Assistant Examiner* — Nhan Huu Nguyen
(74) *Attorney, Agent, or Firm* — Foley & Lardner LLP

(57) ABSTRACT

A blockchain-based authentication system and method is disclosed herein. The blockchain-based authentication system may provide immutable accounting of authenticity, provenance, chain of custody, and ownership for products, which is quickly and simply implemented into a wide range of products and services with low impact to existing business processes. The blockchain-based authentication system may use unique key pairings that cannot be duplicated. In one or more embodiments, the blockchain-based authentication system may include a cloud-based software solution.

18 Claims, 11 Drawing Sheets

(56) References Cited

U.S. PATENT DOCUMENTS

| | | | | |
|---|---|---|---|---|
| 11,673,722 B2* | 6/2023 | Verma | | H04L 9/3239 |
| | | | | 705/332 |
| 11,716,211 B2* | 8/2023 | Schmeling | | G06Q 30/0185 |
| | | | | 713/156 |
| 2011/0274275 A1 | 11/2011 | Seitz | | |
| 2012/0054049 A1* | 3/2012 | Hayes | | G06Q 30/014 |
| | | | | 705/21 |
| 2015/0134552 A1* | 5/2015 | Engels | | G06Q 10/087 |
| | | | | 705/318 |
| 2015/0269570 A1* | 9/2015 | Phan | | G06Q 20/382 |
| | | | | 705/71 |
| 2016/0042032 A1* | 2/2016 | Rosati | | H04L 9/3247 |
| | | | | 235/375 |
| 2016/0098723 A1* | 4/2016 | Feeney | | G06Q 20/065 |
| | | | | 705/75 |
| 2016/0132704 A1* | 5/2016 | Engels | | H04W 4/80 |
| | | | | 340/10.42 |
| 2016/0275461 A1 | 9/2016 | Sprague et al. | | |
| 2016/0300234 A1 | 10/2016 | Moss-pultz et al. | | |
| 2017/0344988 A1* | 11/2017 | Cusden | | H04L 63/12 |
| 2018/0094953 A1* | 4/2018 | Colson | | G06Q 10/0833 |
| 2018/0114220 A1 | 4/2018 | Ekberg | | |
| 2018/0173203 A1* | 6/2018 | Freer | | B29C 64/386 |
| 2018/0174097 A1* | 6/2018 | Liu | | H04L 9/3239 |
| 2018/0189528 A1* | 7/2018 | Hanis | | G06Q 10/087 |
| 2018/0205714 A1* | 7/2018 | Rosati | | H04L 63/0428 |
| 2018/0254894 A1* | 9/2018 | Arnold | | H04L 9/0822 |
| 2018/0314868 A1* | 11/2018 | Raynesford | | H04L 9/0894 |
| 2018/0343114 A1* | 11/2018 | Ben-Ari | | H04L 9/06 |
| 2018/0349893 A1* | 12/2018 | Tsai | | H04L 9/3239 |
| 2019/0012637 A1* | 1/2019 | Gillen | | H04L 9/0819 |
| 2019/0026749 A1* | 1/2019 | Gao | | H04L 9/3247 |
| 2019/0120929 A1 | 4/2019 | Meadow | | |
| 2019/0130484 A1* | 5/2019 | de Jong | | H04L 9/0897 |
| 2019/0180291 A1* | 6/2019 | Schmeling | | G16H 20/10 |
| 2019/0253256 A1 | 8/2019 | Saab et al. | | |
| 2019/0322426 A1* | 10/2019 | Verma | | G06K 19/06037 |
| 2019/0339668 A1* | 11/2019 | Biernat | | G06F 16/248 |
| 2019/0347653 A1* | 11/2019 | Lu | | G06Q 20/3825 |
| 2019/0394025 A1* | 12/2019 | Maim | | G06F 21/87 |
| 2019/0394052 A1 | 12/2019 | Li et al. | | |
| 2020/0013073 A1* | 1/2020 | Bakalis | | G06K 7/1413 |
| 2020/0184547 A1* | 6/2020 | Andon | | G06Q 30/0643 |
| 2020/0273048 A1* | 8/2020 | Andon | | G06Q 20/045 |
| 2020/0322136 A1* | 10/2020 | Irazabal | | H04L 9/088 |
| 2020/0344046 A1* | 10/2020 | Lindeman | | H04L 9/0643 |
| 2020/0364817 A1* | 11/2020 | Liu | | H04L 67/04 |
| 2020/0380520 A1* | 12/2020 | Kavali | | G06Q 20/02 |
| 2021/0075610 A1* | 3/2021 | Covaci | | H04W 12/04 |
| 2021/0103938 A1* | 4/2021 | Bulawski | | H04W 12/47 |
| 2021/0150527 A1* | 5/2021 | Ur | | H04L 9/3247 |
| 2021/0224727 A1* | 7/2021 | Rakhunde | | G08B 13/2417 |
| 2021/0248653 A1* | 8/2021 | McKenzie | | G06F 21/44 |
| 2021/0279715 A1* | 9/2021 | Ilincic | | G06Q 20/40145 |
| 2021/0374497 A1* | 12/2021 | Syed | | G06K 19/073 |
| 2021/0390549 A1* | 12/2021 | Rule | | G06Q 20/4016 |

* cited by examiner

BLOCKCHAIN-BASED AUTHENTICATION SYSTEM AND METHOD

CROSS-REFERENCE TO RELATED APPLICATIONS

This patent application claims priority to, and incorporates by reference in its entirety, U.S. Provisional Patent Application No. 63/047,857, entitled "Blockchain-Based Authentication System And Method", filed on Jul. 2, 2020.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a blockchain-based authentication system and method. More particularly, the invention relates to a blockchain-based authentication system and a method in support of creating public and private keys to be generated to a QR code, an NFC device, or other identifying media (e.g. a chip similar to what can be found on a credit card).

2. Background

Counterfeit and pirated products put the health and safety of consumers worldwide at risk while robbing governments, businesses and communities of tax revenues, profits and legitimate jobs. The negative impacts of counterfeiting and piracy are projected to drain US$4.2 trillion from the global economy and put 5.4 million legitimate jobs at risk by 2022.

The identification of authentic products from counterfeit products prevents inauthentic items from reaching customers, and it protects manufacturers, rights holders, content owners, vendors, and sellers.

Therefore, what is needed is a software solution that provides immutable accounting of authenticity, provenance, chain of custody, and ownership for products that is quickly and simply implemented into a wide range of products and services with low impact to existing business processes. Further, there is a need for a software solution that uses unique key pairings that cannot be duplicated.

BRIEF SUMMARY OF EMBODIMENTS OF THE INVENTION

Accordingly, the present invention is directed to a blockchain-based authentication system and method that substantially obviates one or more problems resulting from the limitations and deficiencies of the related art.

In accordance with one or more embodiments of the present invention, there is provided a method in support of creating public and private keys to be generated to a QR code, NFC device, or other identifying media that can be readable, performed by one or more servers, using a decentralized blockchain technology, with the one or more servers being connected to a network and having memory, one or more processors, and one or more code sets stored in the memory and executable in the one or more processors. The method includes the steps of: (i) receiving, by the one or more processors, first product information for a product from a manufacturer to be associated with a QR code, NFC device, or other identifying media; (ii) allocating, by the one or more processors, the product identified by the manufacturer into a product smart contract or other transaction protocol; (iii) receiving, by the one or more processors, manufacturing details of the product, the manufacturing details including at least one of a registration key, a serial number, manufacturer identifier, and a place of origin; (iv) generating, by the one or more processors, a public key and private key associated with the product that are configured to be used by the manufacturer in the authentication of the product managed by the product smart contract or other transaction protocol; (v) receiving, by the one or more processors, an authentication pairing of the public key and the private key; (vi) providing, by the one or more processors, authentication pairing key data from the manufacturer to be affixed to the product or associated with some media using the QR code, NFC device, or other identifying media; (vii) providing, by the one or more processors, a first phase of product ownership assigned to the manufacturer; (viii) recording, by a blockchain ecosystem, the manufacturing and product details contained within the product smart contract, including an encrypted form of the public key and the private key; (ix) receiving, at the one or more processors, a private inquiry using the public key and the private key generated by the manufacturer, associated to the product or some media, with an authentication call setting; (x) verifying, by the one or more processors, based on the public key and the private key, a look up to the product smart contract or other transaction protocol based on the key pairing provided; (xi) generating, by the one or more processors, a decentralized call to validate the public key and the private key; (xii) verifying, by the blockchain ecosystem having a blockchain ledger, a valid transaction based on the public key and the private key and the associated product smart contract or other transaction protocol for the manufactured product; (xiii) recording, by the one or more processors, a valid authentication transaction and lock to product verification to the blockchain ledger; (xiv) transmitting by the one or more processors, a verification message to a claimant of the private key regarding authentication; and (xv) generating, by the one or more processors, a second phase of product ownership that is allocated to the claimant as the owner of the public and the private key used in authentication.

In a further embodiment of the present invention, the method further comprises the step of: (xvi) providing, by the one or more processors, an ability to create a new public key and private key pairing that is to be used in authentication if ownership is transferred in the future.

In yet a further embodiment, the method further comprises the steps of: (xvi) receiving, by the one or more processors, a request to generate a transport public key that is to be associated with the product smart contract or other transaction protocol; (xvii) generating by the one or more processors, the transport public key that is configured to be used to track transport and is to be associated with the initial authentication pairing keys using the product smart contract or other transaction protocol; (xviii) providing, by the one or more processors, transport key data using a QR code, NFC device, or other identifying media to be associated with the product, product packaging, container containing the product or products, or other package that is configured to be used for transport; (xix) recording, by the blockchain ecosystem, an encrypted form of the transport key associated with the product smart contract; (xx) receiving, at the one or more processors, a public inquiry using the transport public key generated for transport; (xxi) verifying, by the one or more processors, based on the transport public key, a look up to the product smart contract or other transaction protocol based on an authorized user and/or registered user; (xxii) generating, by the one or more processors, a decentralized call to validate the transport public key; (xxiii) verifying, by the blockchain ecosystem, a valid transaction based on the transport public key and the product smart contract or other transaction protocol for the manufactured product; (xxiv) recording, by the one or more processors, an entry of transport details to the blockchain ledger; and (xxv) transmitting by the one or more processors, a verification message to the authorized or registered user regarding the transport update.

In still a further embodiment, the method further comprises the steps of: (xvi) receiving, at the one or more processors, a public inquiry using the public key and private key generated by the manufacturer, associated with the product or some media, with an inquiry call setting; and (xvii) providing, by the one or more processors, historical details of the product, including manufacturing details and transport history.

In accordance with one or more other embodiments of the present invention, there is provided a method in support of creating public and private keys to be generated to a QR code, NFC device, or other identifying media that can be readable, performed by one or more servers, using a decentralized blockchain technology, with the one or more servers being connected to a network and having a memory, one or more processors, and one or more code sets stored in the memory and executable in the one or more processors. The method includes the steps of: (i) receiving, at the one or more processors, first product information for a product to be associated with a QR code, NFC device, or other identifying media; (ii) allocating, by the one or more processors, the product identified by the manufacturer into a product smart contract or other transaction protocol; (iii) receiving, at the one or more processors, manufacturing details of a product, the manufacturing details including at least one of registration key, a serial number, manufacturer identifier, and a place of origin; (iv) generating, by the one or more processors, a public key and a private key associated with the product that are configured to be used together by the manufacturer in the authentication of a product managed by the product smart contract or other transaction protocol; (v) receiving, at the one or more processors, the public key generated by the manufacturer, associated to the product or some media; (vi) receiving, at the one or more processors, the private key generated by the manufacturer, associated with the product which is stored hidden with the product or other media and is configured to be accessible by the consumer after purchasing the product, on the QR code, NFC device, or other identifying media; (vii) providing, by the one or more processors, public key data from the manufacturer to be associated with the product or associated with some media; (viii) providing, by the one or more processors, private key data that is configured to be stored hidden with the product or other media that is accessible after purchasing the product, on the QR code, NFC device or other identifying media; (ix) providing, by the one or more processors, a first phase of product ownership assigned to the manufacturer; (x) recording, by a blockchain ecosystem, the manufacturing and product details contained within the product smart contract, including an encrypted form of the public key and the private key; (xi) receiving, at the one or more processors, a private inquiry using the public key and the private key generated, associated with the product or some media, by the manufacturer for authentication; (xii) verifying, by the one or more processors, based on the public key and the private key pairing, a look up to the product smart contract or other transaction protocol based on the key pairings provided; (xiii) generating, by the one or more processors, a decentralized call to validate the public key and the private key pairing; (xiv) verifying, by the blockchain ecosystem, a valid transaction based on the public key and the private key associated with the product smart contract or other transaction protocol for the manufactured product; (xv) recording, by the one or more processors, a valid authentication transaction and lock to product verification; (xvi) transmitting by the one or more processors, a verification message to a claimant of the public key and the private key regarding authentication; and (xvii) generating, by the one or more processors, a second phase of product ownership that is allocated to the claimant as the owner of the public key and the private key used in authentication.

In a further embodiment of the present invention, the method further comprises the step of: (xviii) providing, by the one or more processors, an ability to create a new public key and private key that is to be used in authentication if ownership is transferred in the future.

In yet a further embodiment, the method further comprises the steps of: (xviii) receiving, at the one or more processors, a request to generate a transport public key that is to be associated with the product smart contract or other transaction protocol; (xix) generating, by the one or more processors, the transport public key that is configured to be used to track transport and is to be associated with the initial authentication pairing using the product smart contract or other transaction protocol; (xx) providing, by the one or more processors, transport key data using the QR code, NFC device, or other identifying media, to be associated with the product, product packaging, or container containing the product or products, or other package that is configured to be used for transport; (xxi) recording, by the blockchain ecosystem, an encrypted form of the transport key associated with the product smart contract; (xxii) receiving, at the one or more processors, a public inquiry using the transport public key generated for transport; (xxiii) verifying, by the one or more processors, based on the transport public key, a look up to the product smart contract or other transaction protocol based on an authorized user and/or registered user; (xxiv) generating, by the one or more processors, a decentralized call to validate the transport public key; (xxv) verifying, by the blockchain ecosystem, a valid transaction based on the transport public key and the product smart contract or other transaction protocol for the manufactured product; (xxvi) recording, by the one or more processors, an entry of transport details to the blockchain ledger; and (xxvii) transmitting by the one or more processors, a verification message to the authorized or registered user regarding the transport update.

In still a further embodiment, the method further comprises the steps of: (xviii) receiving, at the one or more processors, an inquiry using the product public key to view manufacturing details and transport transactions; and (xix) providing, by the one or more processors, historical details of the product, including manufacturing details and transport history.

In accordance with yet one or more other embodiments of the present invention, there is provided a method in support of creating public and private keys to be generated to a QR code, NFC device, or other identifying media that can be readable, performed by one or more servers, using a decentralized blockchain technology, with the one or more servers being connected to a network and having a memory, one or more processors, and one or more code sets stored in the memory and executable in the one or more processors. The method includes the steps of: (i) receiving, by the one or more processors, a material to be associated with a QR code, NFC device, or other identifying media; (ii) allocating, by the one or more processors, the material identified by a supplier into a material smart contract or other transaction protocol; (iii) generating, by the one or more processors, a public key and private key associated with the material that are configured to be used by the supplier and a manufacturer managed by the material smart contract or other transaction protocol; (iv) receiving, by the one or more processors, an authentication pairing of the public key and the private key; (v) providing, by the one or more processors, authentication pairing key data from the supplier to be affixed to the material or associated with some media using the QR code, NFC device, or other identifying media; (vi) providing, by the one or more processors, a first phase of material ownership assigned to the supplier; (vii) recording, by a blockchain ecosystem, the supplier and material details contained within the material smart contract, including an encrypted form of the public key and the private key; (viii) receiving, by the one or more processors, a public key and private key pairing that is configured to be utilized by the manufacturer to claim supplier materials; (ix) verifying, by the blockchain ecosystem, a valid transaction based on the public key and private key associated with the material smart contract or other transaction protocol for supplier materials; (x) providing, by the one or more processors, a second phase of material ownership assigned to the manufacturer; (xi) recording, by the one or more processors, supplier material into a single or multiple batch of materials that is configured to be used in the manufacturing of a product; (xii) receiving, by the one or more processors, a new request by the manufacturer to combine or associate one or more supplier smart contract blockchain ledger details into the manufacturer's product smart contract or other transaction protocol; (xiii) verifying, by the blockchain ecosystem, an accounting of supplier material smart contracts into a consolidated product smart contract for the manufacturer authentication keys; (xiv) generating, by the one or more processors, an additional public key and private key associated with the product that is configured to be used by the manufacturer in the authentication of an item managed by a product smart contract or other transaction protocol; (xv) receiving, by the one or more processors, an authentication pairing of the additional public key and the private key data to be affixed to the product or associated with some media using a QR code, NFC device, or other identifying media; (xvi) providing, by the one or more processors, the authentication pairing data from the manufacturer to be associated with the product or associated with some media; and (xvii) recording, by the one or more processors, the material history that was used in the manufacturing of a product.

In a further embodiment of the present invention, the method further comprises the steps of: (xviii) receiving by the one or more processors, a request to generate a transport public key that is configured to be used to track transport and is configured to be associated with the initial authentication pairing keys using the material smart contract or other transaction protocol; (xix) generating, by the one or more processors, the transport public key that is configured to be used to track transport and is to be associated with the initial authentication pairing using the material smart contract or other transaction protocol; (xx) providing, by the one or more processors, transport key data using the QR code, NFC device, or other identifying media, to be associated with the material or container containing the material or materials, or other package that will be used for transport; (xxi) recording, by the blockchain ecosystem, the supplier and material details contained within the material smart contract, including an encrypted form of the transport key; (xxii) receiving, at the one or more processors, a public inquiry using the transport public key generated for transport; (xxiii) verifying, by the one or more processors, based on the transport public key, a look up to the material smart contract or other transaction protocol based on an authorized user and/or registered user; (xxiv) generating, by the one or more processors, a decentralized call to validate the transport public key; (xxv) verifying, by the blockchain ecosystem, a valid transaction based on the transport public key and the material smart contract or other transaction protocol for a supplier's material; (xxvi) recording, by the one or more processors, an entry to the material smart contract or other transaction protocol of transport details; and (xxvii) transmitting by the one or more processors, a verification message to the authorized or registered user regarding the transport update.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

DETAILED DESCRIPTION OF EMBODIMENTS OF THE INVENTION

Figure 1:
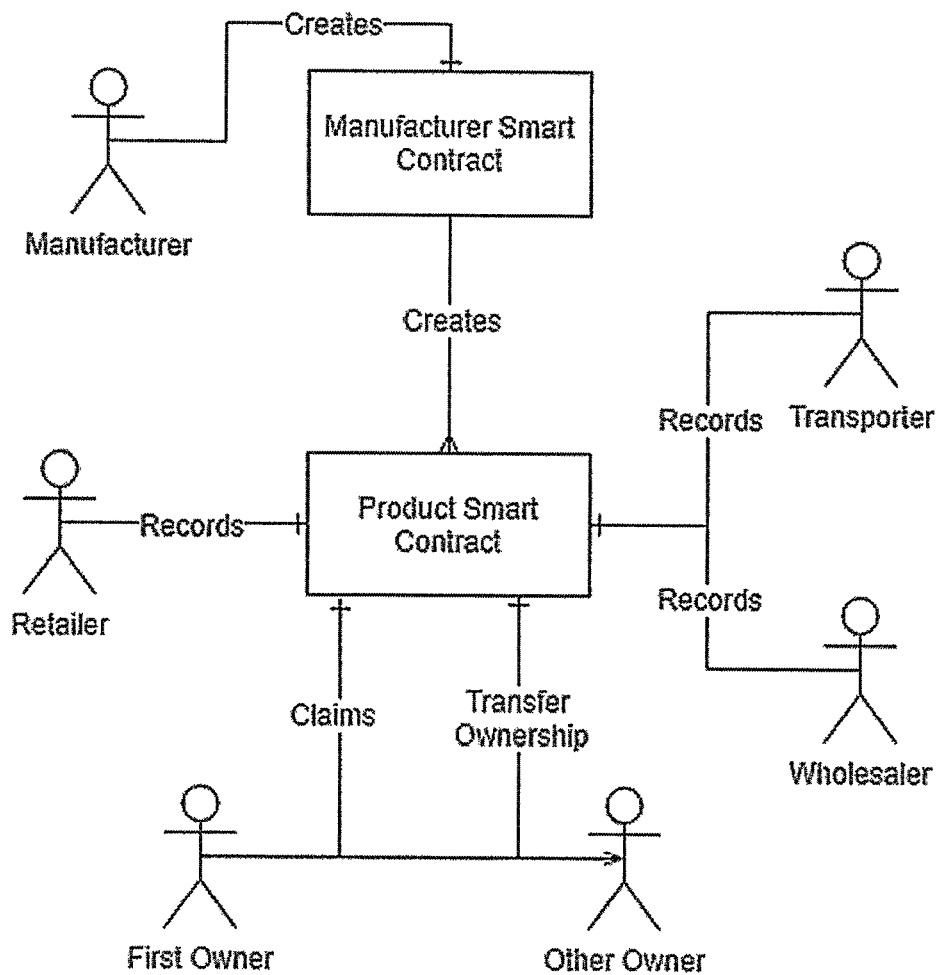
FIG. 1 is a manufacturer unified modeling language (UML) use case diagram for an illustrative embodiment of a blockchain-based authentication system.

In the illustrative embodiment, a main smart contract is controlling all of the functionality of the blockchain-based authentication system and associated method. The manufacturer of a product is added to a blockchain ecosystem, which allows them to virtually give that product a stamp of authenticity. This manufacturer smart contract keeps track of the manufacturer's information, as well as the list of products. Each manufacturer has an individual entry in a product smart contract and every single product they are making receives its own entry, like for example a non-fungible token (NFT). A manufacturer is able to interact with the smart contract and perform a predefined set of actions. Actions can include, but are not limited to, change of manufacturer details, access list of all previously produced products as well as "create" products. It is important to note that when product smart contract is being referred to throughout this embodiment, it can be depicted as a predefined set of rules that are stored on the blockchain that will be executed when a set of conditions are met.

In the illustrative embodiment, a blockchain ecosystem is a publicly distributed ledger that maintains a list of incremental records or transactions (i.e., blocks) which are transparent, secure, and immutable. The blockchain ecosystem is a decentralized system managed autonomously through the use of a peer-to-peer network and a distributed timestamping server. The blockchain ecosystem primarily includes a node application, distributed ledger (i.e., a database), and a consensus algorithm. Every computer connected to the peer-to-peer network requires a node application specific to the blockchain ecosystem that the computer wants to participate in. At a high level, the node application can process a transaction, manage a transaction and its validity, store cryptographic blocks, and act as a point of communication. The distributed ledger has shared contents and databases available to the specific users of the blockchain ecosystem. This shared ledger has its own rules or guidelines that must be followed by all participants in the network and is immutable. Finally, a consensus algorithm is established to provide permanence and security to the data within the blockchain ecosystem based on the transaction definition. The consensus algorithm shows how the nodes within the network reach a common acceptance or consensus about the real time state of the distributed ledger.

A smart contract is a computer protocol intended to digitally facilitate, verify, or enforce the negotiation or performance of a contract. Smart contracts allow the performance of credible transactions without third parties. These transactions are trackable and irreversible and recorded on the blockchain ledger. In the illustrative embodiment, pin codes are not being used in conjunction with a private hash or key to support the authentication method. Also, there are no 'circulating parties' or corresponding circulating keys to be used during product transfer from manufacturer to wholesaler, etc.

In the illustrative embodiment, the first element is the addition of another entry (the product), which keeps track of the chain of ownership, as well as some information about the product, e.g. Manufacturer Identifier (ID), Product Description, Serial Number, Country/State/City of Origin, an NFT entry, every Geo Location of when the item was scanned utilizing the transport key before landing at a retailer, manufacturer suggested retail price, previously sold price, etc. On the creation of the product object, a generation of a SHA512 hash takes place and is stored within that contract to facilitate inquiry, authentication, transport updates and the transfer of ownership. Every other transfer of ownership requires the previous owner to transfer ownership by interacting with the product smart contract. While the SHA512 hash is one possible method of encryption, it is to be understood that, in other embodiments, the blockchain-based authentication system may use other methods for private/authentication key generation (e.g., other encryption methods that are more advanced).

In the illustrative embodiment, all of the data stored in the above-mentioned smart contract is publicly readable on the blockchain.

Figure 4:
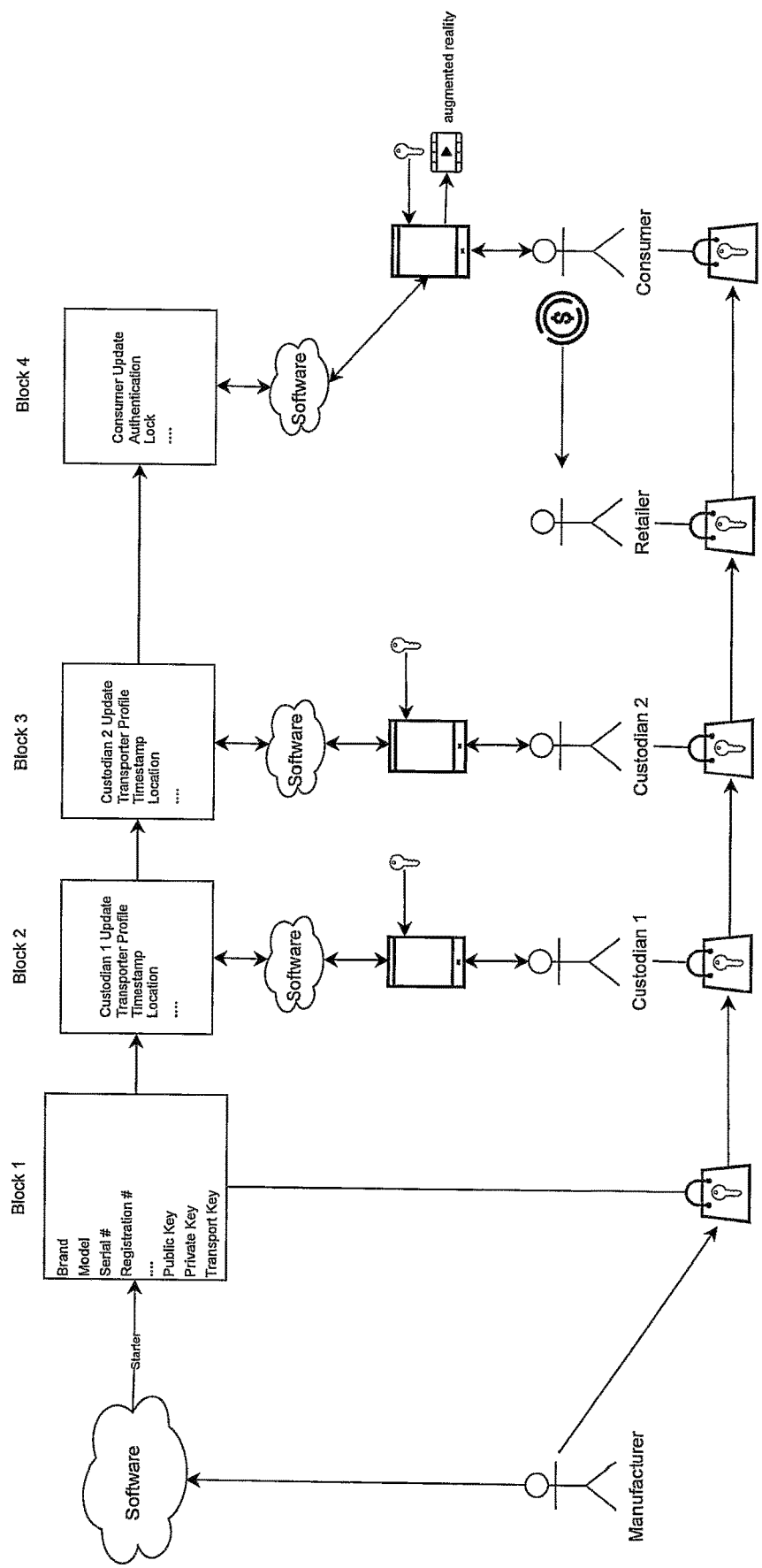
FIG. 4 is a block diagram for the blockchain-based authentication system, which depicts a decentralized public distributed ledger full block with custodian workflow.

FIG. 4 graphically depicts how blocks are added to the blockchain by using the various features associated with the illustrative embodiment of the blockchain-based authentication system. Initially, the block is created by the manufacturer by creating the product smart contract which includes the details about the product. During this process, a unique key is generated and associated with the product. This private key is used for authentication later in the process. After the initial block is created, the product may be transported from one custodian to another. Additional blocks are added to the chain (blockchain ledger) with transport details of the various custodians who are in contact with the product. This process shows the provenance of the product from the manufacturer to retail. The final stage in the process is the transfer of the product to the new owner by a sale and authenticated transaction.

As one example of how the functionality of the blockchain-based authentication system described herein may be used, a luxury brand wants to use the blockchain-based authentication system to ensure their product authenticity. In this example, the product is associated with public and private key pairing using a QR code, microchip, plastic card, or other type of mechanism for tracking utilizing blockchain-based authentication technology (a registration number of the product can be used to ensure pairing with the valid private key by the manufacturer if necessary). A unique public key allows a user to lookup detailed information about the product, including the source and other manufacturing details as well as any transport related transactions. The private key and public key are established as a pairing and generated by the software when the original product smart contract is established. A luxury product may require a custodian workflow or authorized transport user list. Workflow is established to ensure custodianship using the transport public key. The luxury product is shipped to the custodian. The custodian then establishes the chain of custody by updating transport using an authorized user account and enters in an accounting of the product, re-enforcing the workflow. If the product is not transported to the authorized transporter as defined in the custodian workflow, product authenticity may not be able to be validated since the real-world product may need to be in the possession of only authorized transporters. The transporter may be required by the manufacturer to ensure the integrity of the product in transport. The customer purchases the luxury product and uses a private key to authenticate the item when paired with the product public key. Public and private key pairings events are logged and locked during authentication to ensure they are not duplicated in the future. Augmented reality may be generated at the time of authentication. During the authentication process, the manufacturer may elect to add an augmented reality feature during the ownership claim step or any time after. For example, if a manufacturer is selling a hat, during the authentication process, an augmented reality depiction of a rabbit could be coming out of the hat. This could occur as the owner authenticates the product or any time after when interacting with the product using a mobile device. This is a feature that could be possible.

1. Manufacturer

In the illustrative embodiment, authentication for the manufacturer is done through the ownership of the digital address, which in turn is secured with a private key. Even though the manufacturer information stored under that smart contract is public, no one else is able to interact with it.

In the illustrative embodiment, the manufacturer has the ability to create new products and the ability to store those new products in a list of batches. A single batch can contain anywhere from one to millions of products and is an object with its own details and a list of products within it.

As this is a fully decentralized system, the cost of transaction falls on the smart contract itself which, in turn, could be funded by the manufacturer or other agent responsible for the smart contract.

2. Product

In the illustrative embodiment, authentication for the product is done differently in the two (2) phases of ownership: (i) before the product was claimed with the private key and public key pairing; and (ii) after the product was claimed with the private key and public key pairing.

When the product is first created by the manufacturer, a private key (authentication key) is generated and its SHA512 hash is stored on the product smart contract. While the key was not used to initially "lock" the product, locations and places of its movement can be added, to keep track of the transport of the product by using a transport public key. This is performed by scanning the media that is on the shipping package or transport container to identify it and add the entries to the blockchain ledger.

Once the private key has been used (e.g., the smart contract checked the stored SHA512 hash to validate it) to "lock" the product, it enters a locked stage after which no more life cycle type additions can be added in the manufacturer to retail phase of ownership. This happens when a user purchases that product and claims himself as the new owner of that given product. This is to increase security and level of authenticity of the digital version of the product as well as its real-world counterpart. That action could start a list of owners and additional information about them on the product. Every ownership transfer has to be performed by the current owner at the time. This consists of the current owner calling a function on the product smart contract and passing an authentication key to the new owner. One method consists of the old owner and new owner having the software up on their phone and then, the old owner would initiate the transfer of owner function with the new owner address (scanned through a QR code of the person's mobile device). Another method could be when the new purchaser of the item authenticates the product using the public key and private key pairing by scanning the QR code(s), NFC device, or other identifying media (e.g., a radio-frequency identification (RFID) device) originally generated in the manufacturer product smart contract. This method allows the purchaser, manufacturer, or other new owner to initiate a transfer of owner request. The current owner has the ability to review the authentication request and initiate the transfer of owner function. The manufacturer or supplier may also decide to not allow any future private keys to be generated and lock the smart contract from any further processing. This may be necessary since valid authentication keys could be associated with inauthentic products after the initial retail sale is completed.

No actions would be executed on this contract by anyone without the private key as the functions would be permission locked. The contract is immutable and unchangeable as well as unclonable which indicates the complete authenticity of the given object on the digital blockchain and the linked real-world product.

FIG. 1 depicts the unified modeling language (UML) case diagram in the illustrative embodiment for the product flow including the manufacturer, retailer, wholesale and owners. In this example, the manufacturer is the originator of the product smart contract and authentication key using the software. After the product smart contract is created, the product could be transported to another party, namely the transporter, retailor, or wholesaler. These actors can update custodianship of the product utilizing the transport key functionality of the blockchain-based authentication system. Although these are the actors depicted in this example, there could be other type custodians who will be in contact with the product prior to ownership transfer. The first owner can then claim ownership by authenticating the product by using the public key and private key pairing established by the manufacturer. Once ownership has been claimed, the new owner will have the ability to transfer ownership to another owner. The example shows one transfer of ownership between the first owner and the new owner, although this could happen numerous times. As previously mentioned, this function may or may not be permissible based on the rules defined in the product smart contract based on the manufacturer's discretion.

Figure 3:
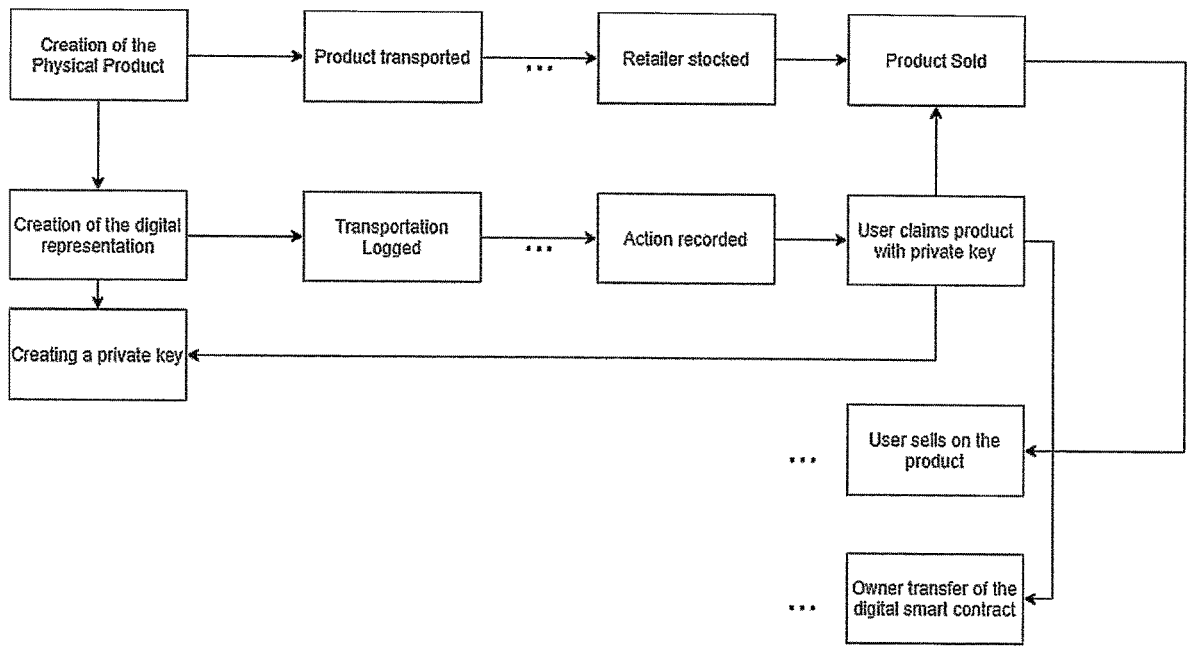
FIG. 3 is a product flow diagram for the blockchain-based authentication system.

FIG. 3 details the product flow from creation to retail transaction ownership in the illustrative embodiment. In other embodiments, the ownership could happen between a manufacturer or other recipient, which is not directly depicted in this process flow. As with the product flow, there is a digital parallel that occurs by using the blockchain-based authentication system. First, when the product is created, there is a private key generated by the manufacturer using a product smart contract or other method. This private key is stored and will be used later by the owner. After the initial digital representation, the product gets transported and those transport transactions are updated and logged by interacting with the public transport key. The transport transactions could include shippers or even a retailer when the item gets delivered to the store for retail sale. Once the product is sold, the private key is also included by which the owner can authenticate the product. At that point, the owner could transfer the digital representation to another owner if available.

3. Physical Private Key Storage

In the illustrative embodiment, the private key designed to authenticate the product is attached to the product in one of a quick response (QR) code, near field communication (NFC) device, radio-frequency identification (RFID) device, or other method as determined by the manufacturer. It is transported with the product and anytime it is scanned (with the accompanying application) an entry will be added to document the claiming of ownership.

In the illustrative embodiment, there are two ways of transporting the physical representations of the private key. In the first way, the QR code, NFC device, or other identifying media contains two keys, one public and one private. The main product smart contract as well as the combined keys gives the user access to the product functionality by utilizing an inquiry or authentication call. When the QR code is scanned, data such as the QR type (e.g., combined), along with both the public and private keys are read by the software. Based on the QR type, software functionality is made available to the user to inquire or authenticate the product. In the case the user chooses an inquiry call, the software will trigger the public key functionality which allows them to lookup product details and transport history. In the case the user chooses an authentication call, the software will utilize the public and private key pairing for authentication and lock to product verification. In the second way, two QR codes, or other identifying media are generated that contain one public key and one private key. The public key is for the main product smart contract including inquiry, and the private key is for the product itself used for authentication. The private key itself is stored hidden inside the product or other media and may only be accessible after purchasing the product, on a QR code, an NFC device, or other identifying media.

4. Supply Materials

In the illustrative embodiment, prior to the manufacturer creating a product smart contract, the materials used in the manufacturing process may also be authenticated and tracked using the same methods described herein. Supplier materials will be their own 'product' and have unique material smart contracts associated with them. Materials can be tracked using the public transport key and authenticated using the public key and private key pairing. During the claiming process, by utilizing the private key, the manufacturer will be able to claim ownership and accumulate batches of materials that will be used in the manufacturing of a product. These material smart contracts can then be added to the manufacturing product smart contract(s) so there will be a historical record of the supply side.

Figure 2:
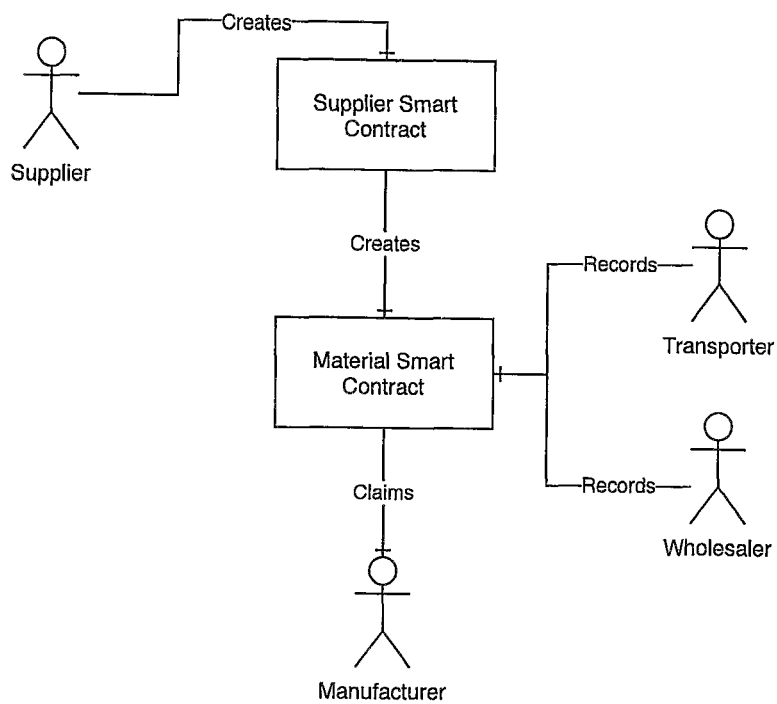
FIG. 2 is a supplier unified modeling language (UML) use case diagram for an illustrative embodiment of a blockchain-based authentication system.

FIG. 2 depicts the unified modeling language (UML) case diagram from the supplier to the manufacturer in the illustrative embodiment. In this depiction, the supplier can generate material smart contracts that can be associated with their materials which could be used in the manufacturing process. The principle behind this interaction is that the materials will flow from supplier to manufacturer to the product and all be authenticated using the same blockchain-based authentication system and blockchain ecosystem.

During the transport of the materials, other actors such as a transporter or wholesaler may be able to update custodianship using the public transport key functionality within the blockchain-based authentication system. Upon arrival to the manufacturer, the materials can be 'claimed' and ownership established. The manufacturer can then use this provenance and incorporate it into their product smart contract.

5. Web-Based Web Application

In the illustrative embodiment, the software with which the manufacturer, transporter and/or the end user will interact with the distributed blockchain smart contract is Vue.js based and cross platform. Although Vue.js and cross-platform is one method, other web-based programming languages may be used to interact with the smart contracts. This solution could evolve in time to other advanced programming languages that are available. The manufacturers' accounts will be created on the blockchain by the individual/company that would have root access to the smart contract. Transporter accounts will be created by the manufacturers within that smart contract. Transporter accounts may also be created by the transporter and added by the manufacturers to their trusted custodian/transporter list. Mobile applications, for example based on iOS or Android, may be developed to support mobile devices (e.g. smart phone, tablet, scanner, etc. using Android, iOS, or other operating systems) directly without having to interact with the web application through a browser on the mobile device.

An end-user can create their own account and is able to authenticate a product, view the products they have "claimed" ownership of, transfer a product, inquire about a product, and add/update their account details.

As all the data is public to the blockchain, anyone could access it, but the web application has an administration portal from which an administrator of the application is able to interact with the smart contract with ease and display statistics of different types without having the need to decipher a database type structure on the smart contract by eye.

The end user has a portal through which they can scan different products and see information about them as well as claim ownership of given products as well as transfer ownership to a new owner, if applicable.

The manufacturer has a portal through which they can create the digital representation of the product which generates product keys and a hash which is pushed into a QR code, an NFC device or other identifying media. The products can also be created in batches and/or added into batches, which makes it simpler to scan 100s or 1000s of products at once at transport. The manufacturers are also able to add transporter accounts through the portal and establish the custodian workflow or authorized user list.

The transporter can scan the product/batch to record its location, transporter details as well as apply a timestamp to when the transaction occurred.

6. Software Modules

In the illustrative embodiment, the blockchain-based authentication system may be implemented using a plurality of different software modules. As previously mentioned, some of these modules may also be adapted and/or developed as a mobile application. These software modules may include: (1) a Web Application End-User Module, (2) Web Application Manufacturer Module, (3) Web Application Transporter Module, (4) Web Application Admin Module, (5) Smart Contract Manufacturer Info Storage/Interaction Module, (6) Smart Contract Product Info Storage/Interaction Module, (7) Key Generation Module, (8) Key Output Generation Module, (9) Key Reader Module, and (10) Product Authenticity "Lock" Module.

The Web Application End-User Module may include functionality configured to: (a) allow a person to register for the application as a user, (b) allow a person to log in to the application as a user, (c) display profile information on the user, (d) allow user to adjust their profile information, (e) display owned products, (f) check information on previously scanned products, (g) check information on the manufacturer based on their ID (within the product object), (h) transfer ownership of owned product, if applicable, and (i) receive product ownership from another user, if applicable.

The Web Application Manufacturer Module may include functionality configured to: (a) allow a person to log in to the application as a manufacturer, (b) display profile information on the manufacturer, (c) allow manufacturer to adjust their profile information, (d) manufacturer is able to create batches of products (interacting with Key Generation, Key Output Generation), (e) manufacturer will be able to create a product (interacting with Key Generation, Key Output Generation), and (f) fund blockchain ecosystem to support transactions. Please note that a variation of this module may also be used for the Supplier.

The Web Application Transporter Module may include functionality configured to: (a) allow a person to log in to the application as a transporter, (b) display profile information on the transporter, (c) allow transporter to adjust their profile information, (d) enable transporter to scan the product to record its history, and (e) create a custodian workflow or authorized user list.

The Web Application Admin Module may include functionality configured to: (a) allow a person to log in to the application as an admin, (b) ability to look through all of the manufacturers, users and admins profiles, (c) ability to look at manufacturer products in detail, and (d) multiple sets of reports available for the statistics of the application usage based on the products and/or users.

The Smart Contract Manufacturer Info Storage/Interaction Module may include: (a) blockchain-based functionality to store profile information about the manufacturer, and (b) blockchain-based functionality to add products/batches of products to the list under manufacturer object. Please note that a variation of this module may also be used for the Supplier.

The Smart Contract Product Info Storage/Interaction Module may include: (a) blockchain-based functionality to mark products transport history, (b) blockchain-based functionality to "lock" the product, and (c) blockchain-based functionality to transfer the product.

The Key Generation Module may be responsible for generating unique keys for authentication, inquiry, transport and "locking" the product.

The Key Output Generation Module may be responsible for accepting multiple inputs (Keys, IDs, etc.) and generating output to a QR code, NFC device, or other identifying media.

The Key Reader Module may be responsible for deciphering a QR code and pulling out all of the initial inputs (Keys, IDs, etc.). Please note that another method that could be generated is an NFC device or other identifying media as previously mentioned. Again, the media in which keys are stored and read could vary depending on the manufacturer's discretion.

The Product Authenticity "Lock" Module may be blockchain-based functionality to "lock" a product from which point it has been authenticated and claimed and will not be considered "new" anymore.

7. Software Architecture

In the illustrative embodiment, the front-end software may be a Javascript-based framework, such as Vue.js. The front-end software may include the Web Application End-User Module, the Web Application Manufacturer Module, the Web Application Transporter Module, the Web Application Admin Module, and the Key Code Reader Module (QR code, NFC device or other identifying media).

In the illustrative embodiment, the back-end software may be a Hypertext Preprocessor (PHP) based framework, such as Laravel. The back-end software may include the Key Generation Module and the Key Output Generation Module (QR code, NFC device, or other identifying media).

In the illustrative embodiment, blockchain-based back-end software may be a Polygon or EOS-based smart contract and ecosystem. The blockchain-based back-end software may include the Smart Contract Manufacturer Info Storage/Interaction Module, the Smart Contract Product Info Storage/Interaction Module, and the Product Authenticity "Lock" Module. Please note that blockchain technology will evolve and the method applied may change over time.

Figure 5:
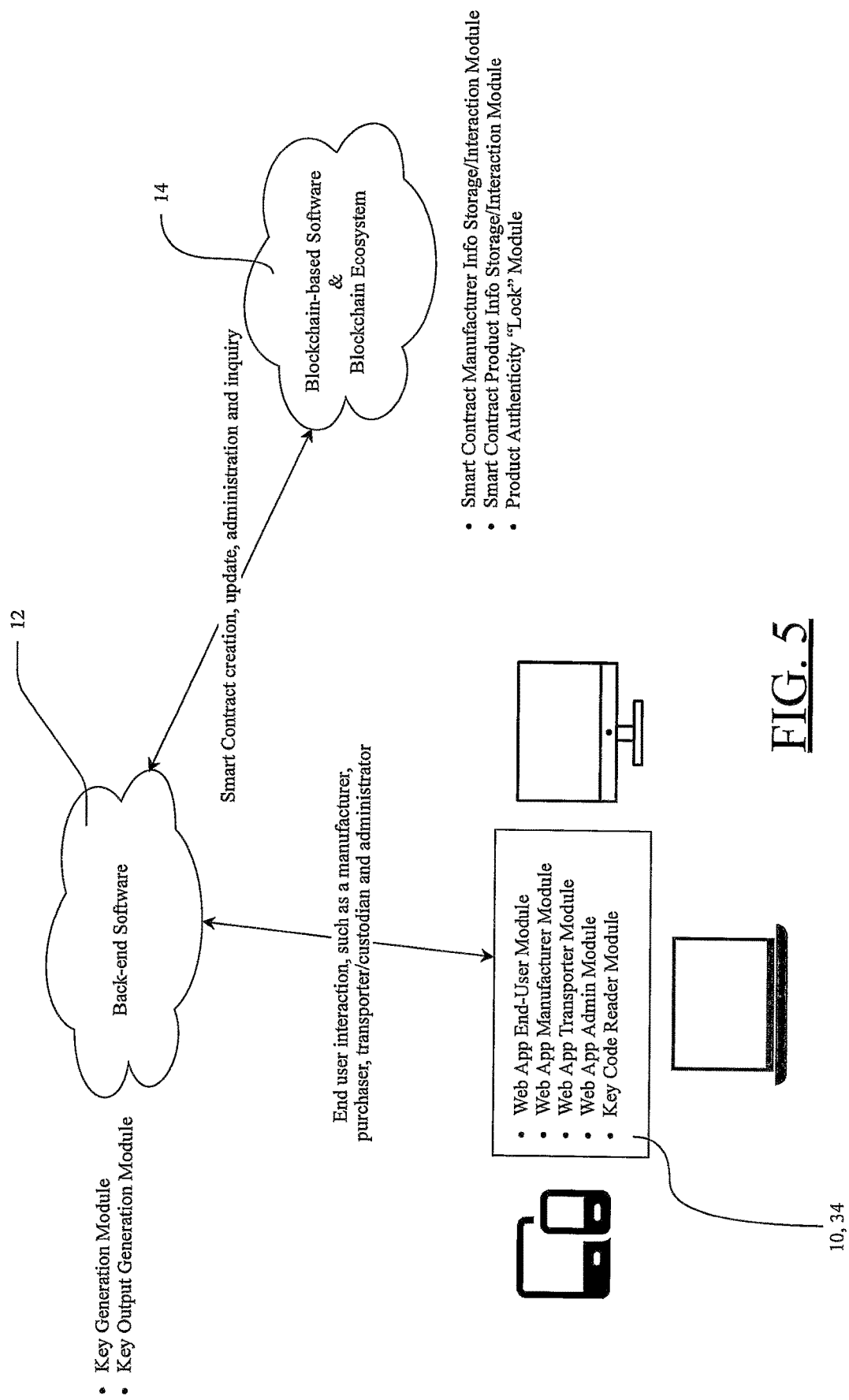
FIG. 5 is a block diagram of exemplary system architecture for an illustrative embodiment of a blockchain-based authentication system.

With reference to FIG. 5, one example of the software architecture for the illustrative blockchain-based authentication system will be described. As shown in this figure, each mobile device (e.g. laptop, smart phone, tablet, scanner, etc.) 10, 34 connected to the system may include one or more items of the front-end software, such as the Web Application End-User Module, the Web Application Manufacturer Module, the Web Application Transporter Module, the Web Application Admin Module, and the Key Code Reader Module. Also, as shown in this figure, the front-end application may also be accessible from any browser compatible desktop or other computing device (e.g. laptop or desktop). Also, as shown in FIG. 5, the back-end software 12 loaded on one or more servers may include the Key Generation Module and the Key Output Generation Module. In FIG. 5, it can be seen that the mobile user, such as the Manufacturer, Purchaser, Transporter, Custodian, or Administrator (Admin) interacts with the back-end software 12 through the front-end software loaded on his or her mobile device or browser compatible computing device 10, 34. Referring again to FIG. 5, it can be seen that the blockchain-based back-end software 14 forming the creation, update, inquiry and administration with the blockchain ecosystem, loaded on one or more servers, may include Smart Contract Manufacturer Info Storage/Interaction Module, the Smart Contract Product Info Storage/Interaction Module, and the Product Authenticity "Lock" Module. As shown in FIG. 5, smart contract creation, updates, and inquiries are enabled by the communication between the front-end software accessible using the device 10, back-end software 12 and the blockchain-based back-end software 14 and the blockchain ecosystem.

8. Illustrative Blockchain-Based Authentication Methods

Figure 6:
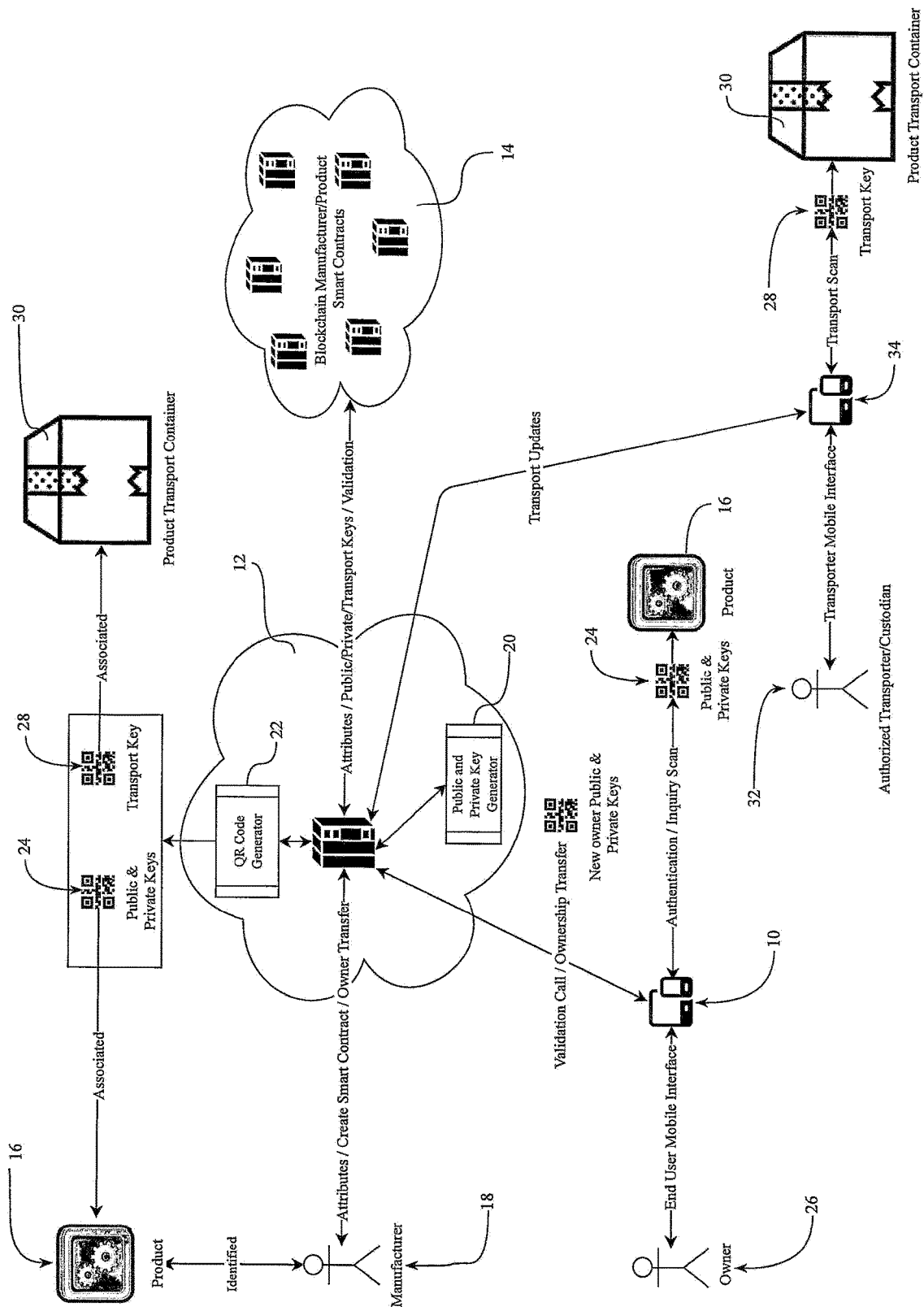
FIG. 6 is a combined keys system process flow diagram for an illustrative embodiment of a blockchain-based authentication system, the diagram depicts the system process flow when the private and public keys are generated to the same QR code, and the diagram further includes transport key generation and the manner in which this key integrates with the overall solution.
Figure 7:
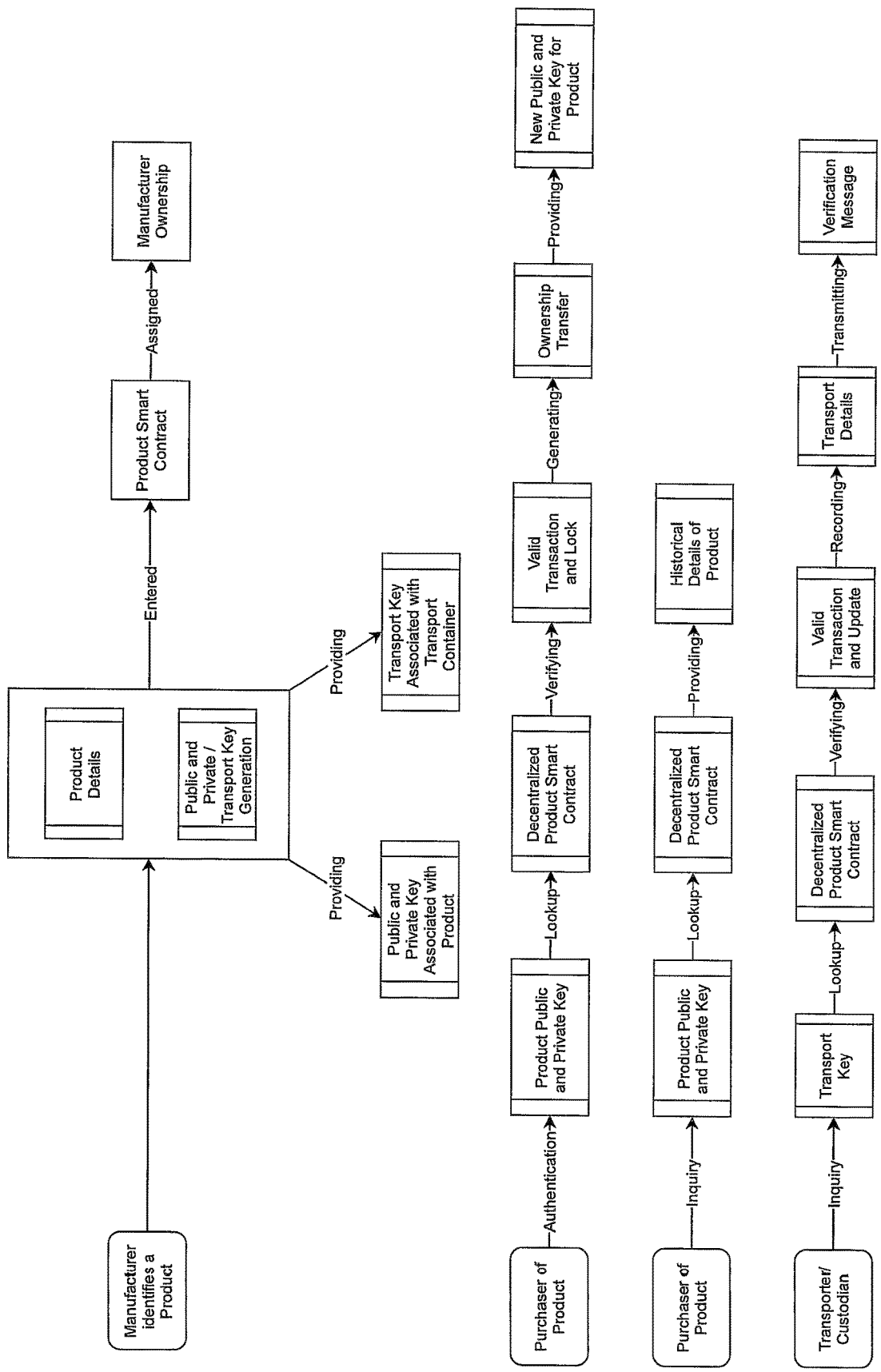
FIG. 7 is a combined keys system process flow narrative diagram for an illustrative embodiment of a blockchain-based authentication system, the diagram depicts the system process flow when the private and public keys are generated to the same QR code.

A first illustrative blockchain-based authentication method will be described with reference to FIGS. 6 and 7. In the illustrative embodiment, the first illustrative blockchain-based authentication method is performed by one or more servers, using a decentralized blockchain technology. Each of the one or more servers is connected to a network and has memory, one or more processors, and one or more code sets stored in the memory and executable by the processor(s). In the illustrative embodiment of FIGS. 6 and 7, it is presumed that the manufacturer smart contract has been previously established. While a QR Code Generator 22 is used in the illustrative embodiment of FIG. 6, it is to be understood that, in other illustrative embodiments, the QR Code Generator 22 could also be represented by a NFC device, or other identifying media used for public/private/transport keys. Also, in other illustrative embodiments, the QR Code Generator 22 may provide a mixed output (i.e., a QR code for the product and NFC device for transport). In FIG. 6, the product container 30 may contain one to many products and the transport key 28 can be used to track multiple products. In the illustrative process described hereinafter, the public and private keys 24 and the transport key 28 are presumed valid and result in a positive response from blockchain ecosystem 14. In the case that a public and private key 24 scan is negative, one or more processors would respond with an invalid result. The negative result could also apply to the transport key 28. Also, in the illustrative embodiment, the manufacturer may first create a manufacturer smart contract, and then a product smart contract as new products are introduced to the blockchain ecosystem.

Initially, one or more processors receive first product information for inclusion in a QR code, an NFC device, or other identifying media to be associated with an item. In the illustrative embodiment, a product 16 is identified by a manufacturer 18 to be associated with the product smart contract. The method is initiated by triggering a product smart contract transaction through an online page or an interface feed into the front-end software accessible using the device 10. Then, one or more processors allocate the product 16 identified by the manufacturer 18 into a product smart contract or other transaction protocol (e.g., custom program developed to interact with a set of unique keys on decentralized servers). In the illustrative embodiment, once the transaction is initiated, a product smart contract transaction entry page is allocated by the software 14 to receive product attributes and software generated keys. The product smart contract transaction entry page may also be allocated in table space by the interface input program. After which, one or more processors receive the manufacturing details of the product 16, the manufacturing details including at least one of a registration key, a serial number, manufacturer identifier, and a place of origin. In the illustrative embodiment, an online page is used for data entry of product attributes into the product smart contract or through an interface that contains the required attributes. After receiving the manufacturing details of the product 16, one or more processors generate a public key and private key 20 associated with the product 16 that are configured to be used by the manufacturer 18 in the authentication of the product 16 managed by the product smart contract or other transaction protocol. In the illustrative embodiment, upon a request through an online page, the software 12 generates random public and private keys to be associated with the product 16. This key generator 20 could also be triggered once an interface feeds product attributes into a product smart contract. Then, one or more processors receive an authentication pairing of the public key and private key. In the illustrative embodiment, the random public and private keys generated by the software 12 are populated into the product smart contract 14 by initiating an online transfer on a page to the corresponding product smart contract 14. While an online transfer is one method, the keys could automatically be loaded to the product smart contract through the program once the product is submitted. After which, one or more processors provide the authentication pairing key label data 22 from the manufacturer 18 to be affixed to the product 16 or associated with some media (e.g., an adhesive label, plastic card, or paper insert provided with or on the product) using the QR code 24, NFC device, or other identifying media. In the illustrative embodiment, by navigating to the create label page, a process is selected and initiated to create the corresponding label 24 to be associated with the product 16 (e.g., by means of the QR Code Generator 22 in FIG. 6).

The illustrative process continues by one or more processors providing a first phase of product ownership assigned to the manufacturer. In the illustrative embodiment, a key component for the product smart contract is to establish ownership, which is finalized when the product smart contract containing the manufacturer 18 as the owner is submitted to the blockchain ecosystem 14 by the software 14. Then, one or more processors are configured to receive a private inquiry using the public key and the private key generated by the manufacturer, associated to the product or some media, with an authentication call setting. In the illustrative embodiment, a new owner 26 may scan the private and public key label 24 by using a QR reader on a mobile device (e.g., smart phone, tablet, scanner, etc.) 10 (see FIG. 6). This scan using the QR code would navigate the user to the software where they can select an authentication call to authenticate the product 30. After which, one or more processors verify, based on the public key and the private key 24, a look up to the product smart contract or other transaction protocol based on the key pairings provided. In the illustrative embodiment, based on the authentication call, the mobile device 10 interacts with the software 14 to initiate the lookup of the public and private key pairing. One or more processors then generate a decentralized call to validate the public key and the private key. That is, in the illustrative embodiment, the software 14 uses the keys 24 provided by the QR reader to then interact with the blockchain ecosystem 14. Next, the blockchain ecosystem 14 verifies a valid transaction based on the combined keys and the associated product smart contract or other transaction protocol for the manufactured product. In the illustrative embodiment, once the authentication call has been validated by decentralized servers that contain one or more processors, within the blockchain ecosystem 14, the blockchain ledger is updated and a message is sent back to the front-end software accessible using the device 10 from the ecosystem 14 indicating the result. If the keys are valid, one or more processors then record a valid authentication transaction, lock to product verification, and update to the blockchain regarding the authentication transaction. In the illustrative embodiment, with a positive message, the product smart contract is then locked so no further authentication can be performed using the original public and private keys associated with the product 16 and the blockchain ledger is updated with the result. After which, one or more processors transmit a verification message to the claimant of the private key regarding authentication. In the illustrative embodiment, the software 14 transmits a response back to the claimant's mobile device 10 indicating the product 16 is authentic, and the new owner 26 has claimed the product 16.

The illustrative process continues by one or more processors generating a second phase of product ownership that is allocated to a claimant as the owner of the private key used in authentication. In the illustrative embodiment, the blockchain ledger is then updated to indicate that a new owner 26 has been established via the mobile device 10 and software 14 to the blockchain ledger. In addition, one or more processors may provide an ability to create a new private key that is to be used in authentication if ownership is transferred in the future. This method would only be allowed if the initial product smart contract allows it. In the illustrative embodiment, through the software 14, the owner 26 can select an action to create a new private key to be associated with the existing product smart contract. This action would be performed if the owner 26 decides to transfer product ownership in the future. The manufacturer may also decide to not allow any future private keys to be generated and lock the product smart contract from any further processing.

Now, with reference again to FIGS. 6 and 7, the first illustrative blockchain-based authentication method may further include steps for validating a public transport key 28 to ensure that the user updating the transport details is a valid and authorized user. This validation is important because transport updates will be loaded to the blockchain for the specific product(s) 16 and thus, will be a permanent entry that cannot be reversed. If the transport key 28 is compromised, and the user is not authorized, then there could potentially be invalid entries to the blockchain ledger. If that happens, then the integrity of the product 16 could be compromised. The transport feature is beneficial because it shows the custodianship and transport activities of the product(s) 16 as they make their way to the retail market from the manufacturer 18. Each transporter/shipper 32 has the responsibility to ensure that the product 16 is not compromised and will be accountable because an audit trail will be enforced in the authentication system. In the illustrative embodiment, the transport key 28 is associated with the product 16 at the time of shipment and is associated (i.e., linked) with the private and public authentication keys 24. The transport key 28 can be considered a feature of the application and the manufacturer 18 may decide to not include it as part of the initial product smart contract.

Initially, with reference to FIG. 6, one or more processors receive a request to generate a transport public key 28 that is to be associated with the product smart contract or other transaction protocol. In the illustrative embodiment, when the product smart contract is established by the manufacturer 18, a request to generate a transport key 28 will be initiated by the user using an online page. In response to the request, one or more processors generate a transport public key 28 that is configured to be used to track transport and is to be associated with the initial authentication pairing using the product smart contract or other transaction protocol. In the illustrative embodiment, upon a request through an online page or interface, the software 12 generates a random transport key 28 that will be associated with the product(s) and product smart contract. Then, one or more processors provide transport key label data 22 from the manufacturer 18 to be associated with the product 16, product packaging, or container 30 containing the product 16 or products, or other package that is configured to be used for transport (see FIG. 6). In the illustrative embodiment, by navigating to the create label page in the software 12, a process is selected and initiated to create the corresponding transport key label that will be associated with the packaging or shipping container 30 for the product 16. Then, one or more processors are configured to receive a public inquiry using the public key 28 generated for transport. In the illustrative embodiment, an authorized transporter or custodian 32 will use a mobile (e.g., smart phone, tablet, scanner, etc.) device 34 with, for example, a QR reader to scan the packaging or shipping container transport key 28 of the product 16. Through software, the transport key 28 along with the shipper details will be transferred to the software 14. After which, one or more processors verify, based on the transport public key 28, a look up to the product smart contract or other transaction protocol based on an authorized user and/or registered user 32. In the illustrative embodiment, when the transport key 28 and shipper details message is received by the software 14, the software 14 will validate the user and prepare a message for transport update. One or more processors then generate a decentralized call to validate the transport public key 28. In the illustrative embodiment, through the front-end software accessible using the device 10, a transport message will be sent to the blockchain ecosystem 14 to validate the transport key 28. The blockchain ecosystem 14 verifies a valid transaction based on the public key 28 and the product smart contract or other transaction protocol for the manufactured product 16. In the illustrative embodiment, based on the transport update message from the front-end software accessible using the device 10, the blockchain ecosystem 14 will validate the transport transaction against the existing product smart contract for the product 16. Then, the one or more processors record an entry of transport details to the blockchain ledger or other transaction protocol. In the illustrative embodiment, once the blockchain ecosystem 14 has validated the transaction, the blockchain ledger will be updated with the shipping details. Finally, one or more processors transmit a verification message to the authorized or registered user 32 regarding the transport update. In the illustrative embodiment, the front-end software accessible using the device 10, from the blockchain ecosystem 14, transmits a response back to the transporter's mobile device 34 with a verification message of the transport update.

Next, with reference again to FIGS. 6 and 7, the first illustrative blockchain-based authentication method may further include steps for allowing a user to make a public inquiry to obtain historical details regarding the product 16. Initially, during the inquiry process, one or more processors receive a public inquiry using the public key and private key 24 generated by the manufacturer 18, associated to the product 16 or some media, with an inquiry call setting. In the illustrative embodiment, an end user may scan the private and public key label by using a QR reader on a mobile device (e.g., smart phone, tablet, scanner, etc.) 10. This scan using the QR code would navigate the user to the software 14 where he or she can select an inquiry call. This process is driven from the mobile device 10 through the software 14 to the blockchain ecosystem 14 to perform a product smart contract and blockchain ledger lookup. After which, one or more processors provide historical details of the product 16, including manufacturing details and transport history. In the illustrative embodiment, the blockchain ecosystem 14 interacts with the software 14 and ultimately the end user's mobile device 10 to supply the end user the initial manufacturer details as well as any transport updates that may have occurred, without claiming ownership.

Figure 8:
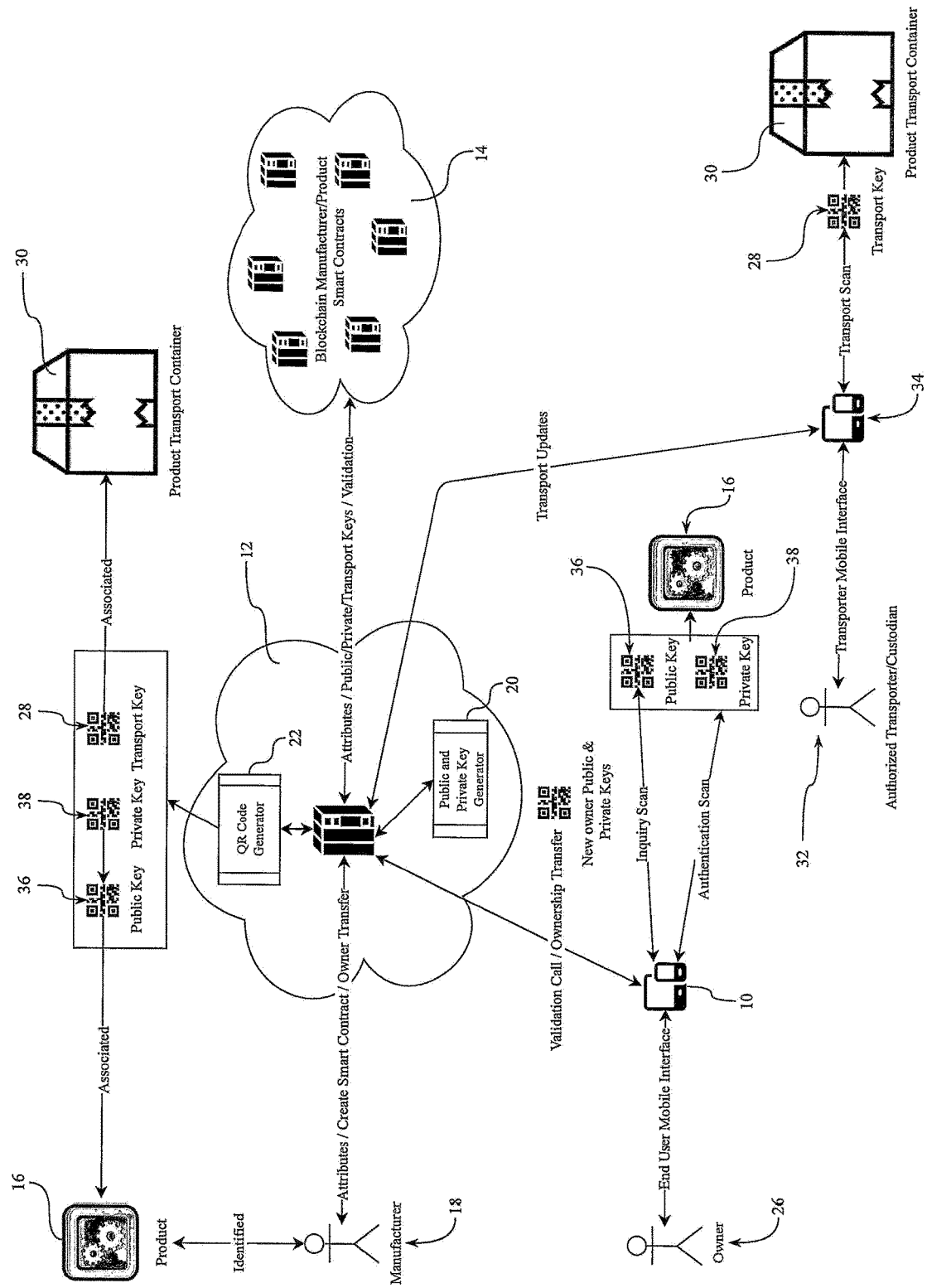
FIG. 8 is a separate keys system process flow diagram for an illustrative embodiment of a blockchain-based authentication system, the diagram depicts the system process flow when the private and public keys are generated separately to a QR code, and diagram further includes transport key generation and the manner in which this key integrates with the overall solution.
Figure 9:
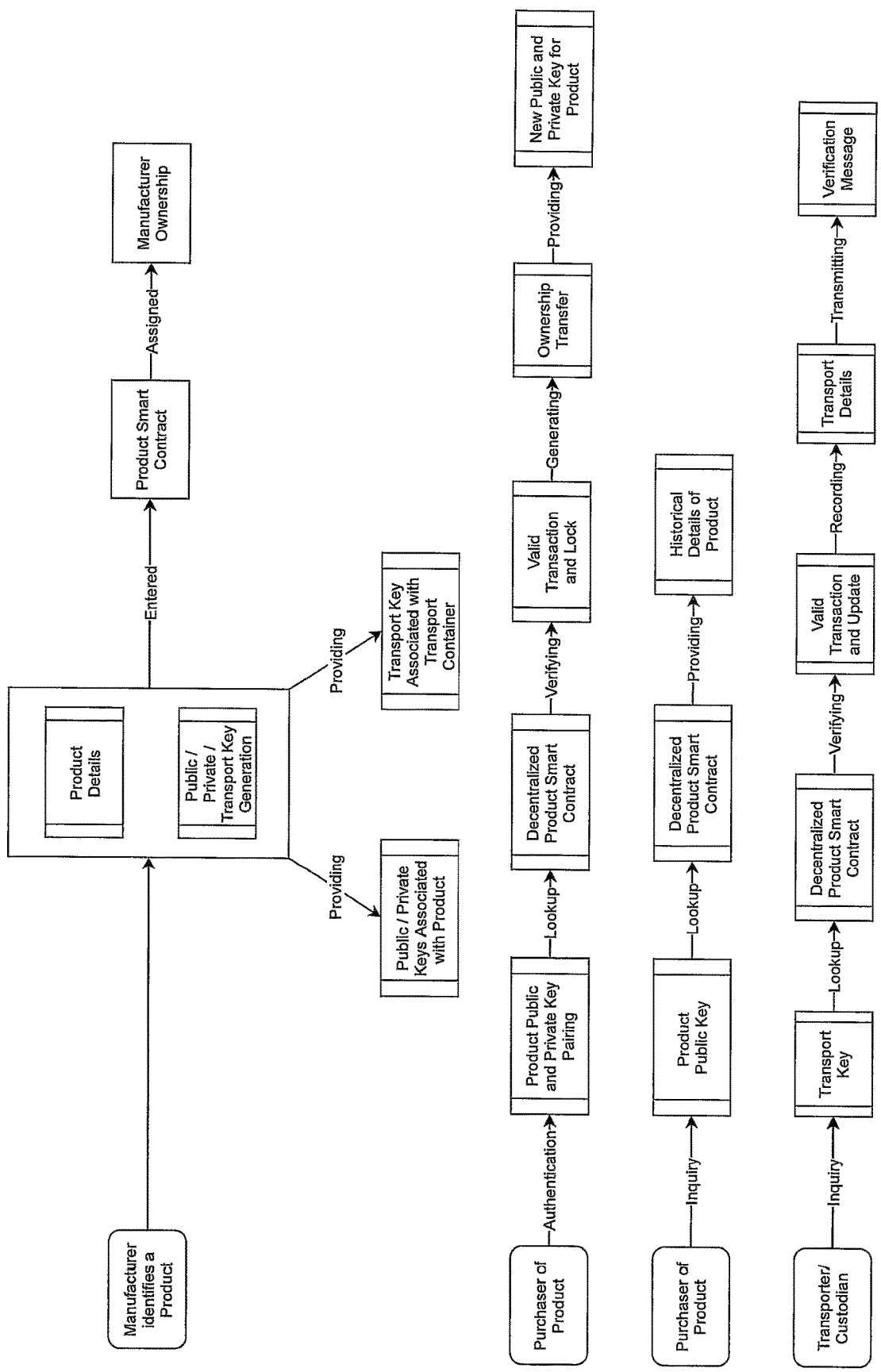
FIG. 9 is a separate keys system process flow narrative diagram for an illustrative embodiment of a blockchain-based authentication system, the diagram depicts the system process flow when the private and public keys are generated separately to a QR code.

A second illustrative blockchain-based authentication method will be described with reference to FIGS. 8 and 9. In the illustrative embodiment, the second illustrative blockchain-based authentication method is performed by one or more servers, using a decentralized blockchain technology. Each of the one or more servers is connected to a network and has memory, one or more processors, and one or more code sets stored in the memory and executable by one or more processors. In the illustrative embodiment of FIGS. 8 and 9, it is presumed that the manufacturer smart contract has been previously established. While a QR Code Generator 22 is used in the illustrative embodiment of FIG. 8, it is to be understood that, in other illustrative embodiments, the QR Code Generator 22 could also be represented by NFC device or other identifying media used for public/private/transport keys. In FIG. 8, the product container 30 may contain one to many products and the transport key 28 can be used to track multiple products. In the illustrative process described hereinafter, the public and private keys 36, 38 and the transport key 28 are presumed valid and result in a positive response from blockchain ecosystem 14. In the case that a public and private key 36, 38 scans are negative, one or more processors would respond with an invalid result. The negative result could also apply to the transport key 28.

Initially, one or more processors receives first product information (e.g., a registration number or serial number) for inclusion in a QR code, NFC device or other identifying media to be associated with the item. In the illustrative embodiment, a product 16 is identified by a manufacturer 18 to be associated with the product smart contract. The method is initiated by triggering a product smart contract transaction through an online page or an interface feed into the front-end software accessible using the device 10. Then, one or more processors allocate a product 16 identified by the manufacturer 18 into a product smart contract or other transaction protocol. In the illustrative embodiment, once the transaction is initiated, a product smart contract transaction entry page is allocated by the software 14 to receive product attributes and software generated keys 20. The product smart contract transaction entry page may also be allocated in table space by the interface input program. After which, one or more processors receives the manufacturing details of the product 16, the manufacturing details including at least one of registration key, a serial number, manufacturer identifier, and a place of origin. In the illustrative embodiment, an online page is used for data entry of product attributes into the product smart contract or through an interface that contains the required attributes. After receiving the manufacturing details of the product 16, one or more processors generates a public key 36 and a private key 38 (see FIG. 8) associated with the product 16 that are configured to be used by the manufacturer 18 in the authentication of an item managed by the product smart contract or other transaction protocol. In the illustrative embodiment, upon a request through an online page, the software 12 generates a random public and private key to be associated with the product 16. This key generator 20 could also be triggered once an interface feeds product attributes into a product smart contract. Then, one or more processors receive the public key 36 for the product smart contract or other transaction protocol. In the illustrative embodiment, the random public key 36 generated by the software 12 is populated into the product smart contract 14 by initiating an online transfer on a page to the corresponding product smart contract 14. While an online transfer is one method, the keys could automatically be loaded to the smart contract through the program after being generated. After which, one or more processors receives the private key 38 which is configured to be stored hidden inside the product 16 or other media and is accessible only after purchasing the product 16, on the QR code, NFC device, or other identifying media. In the illustrative embodiment, the random private key 38 generated by the software 12 is populated into the product smart contract 14 by initiating an online transfer on a page to the corresponding product smart contract 14. Then, one or more processors provide a public key label data 22 that is associated with the product smart contract or other transaction protocol which allows details of the product and transport details to be available for view. In the illustrative embodiment, by navigating to the create label page, a process 22 is selected and initiated to create the corresponding public key label 36 to be associated with the product 16 (e.g., by means of the QR code generator 22 in FIG. 8). Also, one or more processors provide a private key label 38 that is configured to be stored hidden inside the product 16 or some other media that is only accessible after purchasing the product 16, on the QR code, NFC device, or other identifying media. In the illustrative embodiment, by navigating to the create label page, a process is selected and initiated to create the corresponding private key label 38 to be associated with the product 16 (e.g., by means of the QR code generator 22 in FIG. 8).

The illustrative process continues by one or more processors providing a first phase of product ownership assigned to the manufacturer. In the illustrative embodiment, a key component for the product smart contract is to establish ownership, which is finalized when the product smart contract containing the manufacturer 18 as the owner is submitted to the blockchain ecosystem 14 by the software 14. Then, one or more processors is configured to receive a private inquiry using the public key 36 and the private key 38, associated with the product 16 or some media, generated by the manufacturer 18 for authentication. In the illustrative embodiment, a new owner 26 may scan the private key label 38 by using a QR reader on a mobile device 10 (see FIG. 8). This scan using the QR code would message the software 14 and return a message response back to the user to provide the corresponding public key label 36 to be used in authentication. Both keys 36, 38 scanned together will trigger an authentication call that will allow the user to authenticate the product 16. After which, one or more processors verifies based on the public key 36 and the private key 38, a look up to the product smart contract or other transaction protocol based on the key pairings provided. In the illustrative embodiment, the public or private key lookup is performed by scanning using a QR reader or other type of reader depending on how the label was generated. This step along with the prior step establishes the pairing of the private and public keys 36, 38 that were originally generated and associated with the product 16. One or more processors then generate a decentralized call to validate the public key 36 and the private key 38. In the illustrative embodiment, the software 14 uses the private and public key pairing scanned by the QR reader to then interact with the blockchain ecosystem 14. Next, the blockchain ecosystem 14 verifies a valid transaction based on the public and private keys 36, 38 and the associated product smart contract or other transaction protocol for the manufactured item. In the illustrative embodiment, once the authentication call has been validated by decentralized servers that contain one or more processors, within the blockchain ecosystem 14, the blockchain ledger is updated and a message is sent back to the front-end software accessible using the device 10 from the ecosystem 14 indicating the result. While blockchain is one method to validate the product smart contract, in other embodiments, other decentralized methods could be used to validate the product. One or more processors then record a valid authentication transaction and lock to product verification. In the illustrative embodiment, with a positive message, the product smart contract is then locked so no further authentication can be performed using the original public and private keys 36, 38 associated with the product 16 and the blockchain ledger is updated with the result. After which, one or more processors transmits a verification message to the claimant of the private key regarding authentication. In the illustrative embodiment, the software 14 transmits a response back to the claimant's mobile device 10 indicating the product 16 is authentic, and the new owner 26 has claimed the product 16.

The illustrative process continues by one or more processors generating a second phase of product ownership that is allocated to a claimant as the owner of the private key used in authentication. In the illustrative embodiment, the blockchain ledger is then updated to indicate that a new owner 26 has been established. In addition, one or more processors provide an ability to create a new private key that is to be used in authentication if ownership is transferred in the future, if applicable. In the illustrative embodiment, through the software 14, the owner 26 can select an action to create a new private key to be associated with the existing product smart contract. This action would be performed if the owner 26 decides to transfer product ownership in the future. The manufacturer may also decide to not allow any future private keys to be generated and lock the smart contract from any further processing.

Now, with reference again to FIGS. 8 and 9, the second illustrative blockchain-based authentication method may further include steps for validating a public transport key to ensure that the user updating the transport details is a valid and authorized user. This validation is important because transport updates will be loaded to the blockchain ledger for the specific product(s) 16 and thus, will be a permanent entry that cannot be reversed. If the transport key 28 is compromised, and the user is not authorized, then there could potentially be invalid entries to the blockchain ledger. This would only happen if the manufacturer does not enforce a custodian workflow or authorized user validation for transport updates. If that happens, then the integrity of the product 16 could be compromised. The transport feature is beneficial because it shows the custodianship and transport activities of the product(s) 16 as they make their way to the retail market from the manufacturer 18. Each transporter/shipper 32 has the responsibility to ensure that the product 16 is not compromised and will be accountable because an audit trail will be enforced in the authentication system. In the illustrative embodiment, the transport key 28 is associated with the product 16 at the time of shipment and is associated (i.e., linked) with the private and public authentication keys 36, 38. The transport key 28 can be considered a feature of the application and the manufacturer 18 may decide to not include it as part of the initial product smart contract.

Initially, with reference to FIG. 8, one or more processors receive a request to generate a transport public key 28 that is to be associated with the product smart contract or other transaction protocol. In the illustrative embodiment, when the product smart contract is established by the manufacturer 18, a request to generate a transport key 28 will be initiated by the user using an online page. In response to the request, one or more processors generates a public key 28 that is configured to be used to track transport and is to be associated with the initial authentication pairing using the product smart contract or other transaction protocol. In the illustrative embodiment, upon a request through an online page or interface, the software 12 generates a random transport key 28 that will be associated with the product(s) and product smart contract. Then, one or more processors provide transport key label data from the manufacturer 18 to be associated with the product 16, product packaging, or container 30 containing the product or products, or other package that is configured to be used for transport (see FIG. 8). In the illustrative embodiment, by navigating to the create label page in the software 12, a process is selected and initiated to create the corresponding transport key label 28 that will be associated with the packaging or shipping container 30 for the product 16. Then, one or more processors are configured to receive a public inquiry using the public key 28 generated for transport. In the illustrative embodiment, an authorized transporter or custodian 32 will use a mobile device 34 with, for example, a QR reader to scan the packaging or shipping container transport key 28 of the product 16. Through software, the transport key 28 along with the shipper details will be transferred to the software 14. After which, one or more processors verify, based on the transport public key 28, a look up to the product smart contract or other transaction protocol based on an authorized user and/or registered user. In the illustrative embodiment, when the transport key 28 and shipper details message is received by the front-end software accessible using the device 10, the software 14 will validate the user and prepare a message for transport update. Then, one or more processors generate a decentralized call to validate the transport public key 28. In the illustrative embodiment, through the software 14, a transport message will be sent to the blockchain ecosystem 14 to validate the transport key 28. The blockchain ecosystem 14 verifies a valid transaction based on the public key 28 and the product smart contract or other transaction protocol for the manufactured product 16. In the illustrative embodiment, based on the transport update message from the software 14, the blockchain ecosystem 14 will validate the transport transaction against the existing product smart contract for the product 16. Then, one or more processors record an entry of transport details to the blockchain ledger or other transaction protocol. In the illustrative embodiment, once the blockchain ecosystem 14 has validated the transaction, the blockchain ledger will be updated with the shipper details. Finally, one or more processors transmit a verification message to the authorized or registered user 32 regarding the transport update. In the illustrative embodiment, the software 14 from the blockchain ecosystem 14, transmits a response back to the transporter's mobile device 34 with a verification message of the transport update.

Next, with reference again to FIGS. 8 and 9, the second illustrative blockchain-based authentication method may further include steps for allowing a user to make a public inquiry to obtain historical details regarding the product 16. Initially, during the inquiry process, one or more processors receive a public inquiry using the public key 36 to view manufacturing details and historical transport transactions. In the illustrative embodiment, an end user may scan the public key label 36 by using a QR reader on a mobile device (e.g., smart phone, tablet, scanner, etc.) 10. This scan using the QR code would navigate the user to the front-end software accessible using the device 10. Based on the label type (public key) lookup, this would drive a transaction to the blockchain ecosystem 14 to perform a product smart contract lookup. Finally, one or more processors provide historical details of the product 16, including manufacturing details and transport history. In the illustrative embodiment, the blockchain ecosystem 14 interacts with the software 14 and ultimately the end user's mobile device 10 to supply the end user the initial manufacturer details as well as any transport updates that may have occurred, without claiming ownership of the product 16.

Figure 10:
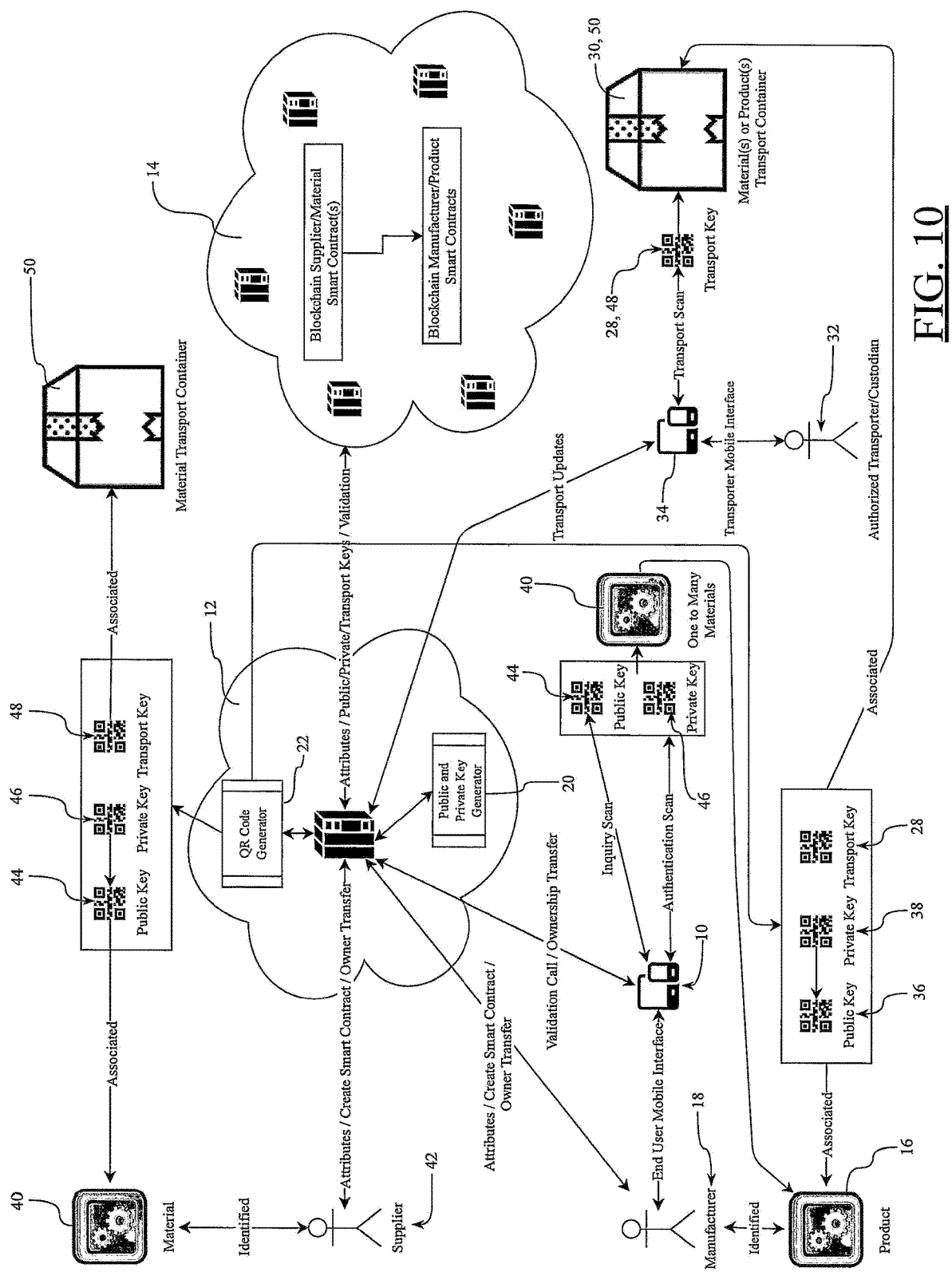
FIG. 10 is a supplier material to manufacturer product integration system process flow diagram for an illustrative embodiment of a blockchain-based authentication system, the diagram depicts the supplier material integration with the manufacturer product, and diagram further includes transport key generation and the manner in which this key integrates with the overall solution.
Figure 11:
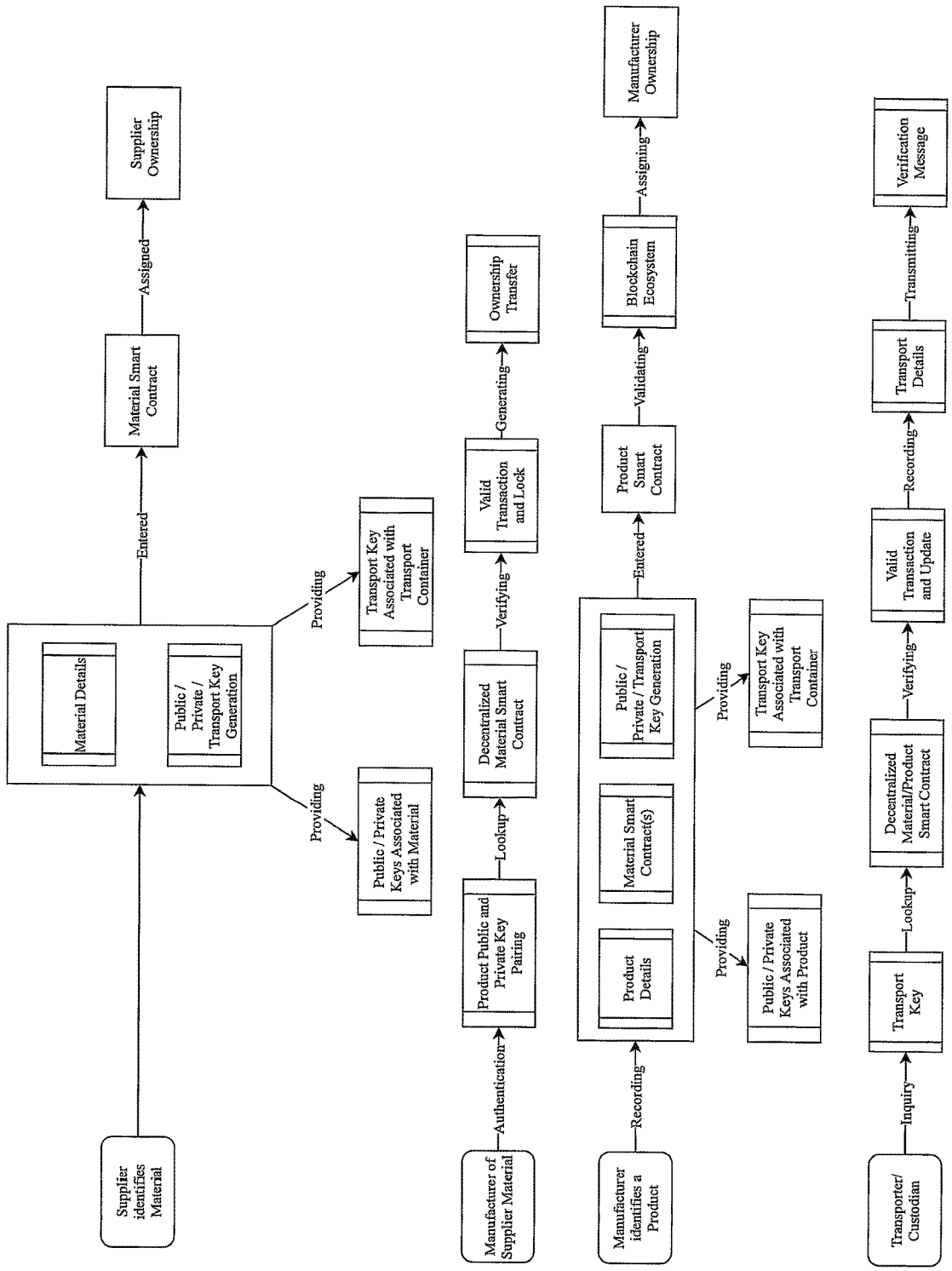
FIG. 11 is a supplier material to manufacturer product integration system process flow narrative diagram for an illustrative embodiment of a blockchain-based authentication system.

A third illustrative blockchain-based authentication method will be described with reference to FIGS. 10 and 11. In the illustrative embodiment, the third illustrative blockchain-based authentication method is performed by one or more servers, using a decentralized blockchain technology. Each of the one or more servers is connected to a network and has memory, one or more processors, and one or more code sets stored in the memory and executable by one or more processors. In the illustrative embodiment of FIGS. 10 and 11, it is presumed that the supplier smart contract has been previously established. While a QR Code Generator 22 is used in the illustrative embodiment of FIG. 10, it is to be understood that, in other illustrative embodiments, the QR Code Generator 22 could also be represented by NFC device, or other identifying media used for the material public key, private key or transport key. In FIG. 10, the material container 50 may contain one to many materials and the transport key 48 can be used to track multiple materials. In the illustrative process described hereinafter, the public and private keys 44, 46 and the transport key 48 are presumed valid and result in a positive response from blockchain ecosystem 14. In the case that a public and private key 44, 46 scan is negative, one or more processors would respond with an inauthentic result. A negative result could also apply to the transport key 48.

Initially, one or more processors receive supplier material for inclusion in a QR code, NFC device, or other identifying media to be associated with the material. In the illustrative embodiment, a material 40 is identified by a supplier 42 to be associated with the material smart contract. The method is initiated by triggering a material smart contract transaction through an online page or an interface feed into the front-end software accessible using the device 10. Then, one or more processors allocate the material 40 identified by the supplier 42 of an item into a material smart contract or other transaction protocol. In the illustrative embodiment, once the transaction is initiated, a material smart contract transaction entry page is allocated by the software 14 to receive material attributes and software generated keys. The material smart contract transaction entry page may also be allocated in table space by the interface input program. After which, one or more processors receives the material details including at least one of a registration key, supplier identifier, and a place of origin. In the illustrative embodiment, an online page is used for data entry of material attributes into the material smart contract or through an interface that contains the required attributes. After receiving the material details, one or more processors generate a public and private key 44, 46 associated with the material 40 that are configured to be used by a supplier 42 managed by the material smart contract or other transaction protocol. Please note that in this example separate public and private keys are generated, however the supplier may generate combined public and private keys as previously outlined in this document. In the illustrative embodiment, upon a request through an online page, the software 12 generates random public and private keys 44, 46 to be associated with the material 40. This key generator 20 could also be triggered once an interface feeds product attributes into a material smart contract. Then, one or more processors receive an authentication pairing of the public and private key 44, 46. In the illustrative embodiment, the random public and private keys 44, 46 generated by the software 12 are populated into the material smart contract 14 by initiating an online transfer on a page to the corresponding material smart contract 14. While an online transfer is one method, the keys could automatically be loaded to the smart contract through the program after being generated. After which, one or more processors provide authentication pairing key label data from the supplier 42 to be affixed to the material 40 or associated with some media using the QR code, NFC device, or other identifying media. In the illustrative embodiment, by navigating to the create label page, a process is selected and initiated to create the corresponding label to be associated with the material 40 (e.g., by means of the QR Code Generator 22 in FIG. 10). In the illustrative embodiment, separate labels are being generated that contain the public and private keys 44, 46 used for authentication. In other embodiments, a single label alternatively may be generated for the public key 44 and private key 46.

The illustrative process continues by one or more processors providing a first phase of product ownership assigned to the supplier. In the illustrative embodiment, a key component for the material smart contract is to establish ownership, which is finalized when the material smart contract containing the supplier 42 as the owner is submitted to the blockchain ecosystem 14 by the software 14. Then, one or more processors receive a public and private key pairing that is configured to be utilized by the manufacturer 18 to claim supplier materials. In the illustrative embodiment, the manufacturer 18 can scan the private and public key labels 44, 46 by using a QR reader on a mobile device 10 (e.g., smart phone, tablet, scanner, etc.). This scan using the QR code would navigate the manufacturer 18 to the software 14 where they can select an authentication call to authenticate the product 16. The blockchain ecosystem 14 verifies a valid transaction based on the public and private keys 44, 46 and the associated material smart contract or other transaction protocol for supplier materials. In the illustrative embodiment, based on the authentication call, the mobile device 10 will interact with the software 14 to initiate the lookup of the public and private key pairing. The software 14 uses the keys provided by the QR reader to then interact with the blockchain ecosystem 14. Once the authentication call has been positively validated by decentralized servers that contain one or more processors, within the blockchain ecosystem 14, the blockchain ledger is updated and a message is sent back to the front-end software accessible using the device 10 from the ecosystem 14 indicating the result.

The illustrative process continues by one or more processors providing a second phase of product ownership that is assigned to the manufacturer 18. In the illustrative embodiment, with a positive message, the material 40 is then locked so no further authentication can be performed using the original public and private keys 44, 46 associated with the material 40 and the material smart contract is updated with the result. Then, one or more processors record the supplier material 40 into a single or batch of materials that is configured to be used in the manufacturing of a product 16. In the illustrative embodiment, through an online page or other means, the software 14 now enables the authorized manufacturer 18 to select the material smart contract(s) that will be incorporated into the product smart contract. In addition, one or more processors are configured to receive a new request by the manufacturer 18 to combine one or more material smart contract blockchain details into the manufacturer's product smart contract or other transaction protocol. In the illustrative embodiment, once the manufacturer 18 selects, through an online page, the applicable material smart contracts that they have claimed ownership of, a process is initiated through the online page to consolidate the material smart contract(s) into a product smart contract that will demonstrate provenance of the materials to flow into the product 16. The blockchain ecosystem 14 verifies an accounting of material smart contracts into a consolidated product smart contract for the manufacturer authentication keys. In the illustrative embodiment, the software 14 interacts with the blockchain ecosystem 14 to account for the consolidation and creation of a new product smart contract. Turning again to FIG. 10, one or more processors generate public and private keys 36, 38 associated with the product 16 that is configured to be used by the manufacturer 18 in the authentication of an item managed by a decentralized product smart contract or other transaction protocol. In the illustrative embodiment, upon a request through an online page, the software 12 generates random public and private keys 36, 38 to be associated with the product 16. Then, one or more processors receive an authentication pairing of the public and private key 36, 38 to be affixed to the product or associated with some media using a QR code, NFC device, or similar type technologies. In the illustrative embodiment, the random public and private keys 36, 38 generated by the software 12 are populated into the product smart contract by initiating an online transfer on a page to the corresponding product smart contract. After which, one or more processors provide the authentication pairing keys to the manufacturer 18 to be associated with the item or associated with some media. In the illustrative embodiment, by navigating to the create label page, a process is selected and initiated to create the corresponding label to be associated with the product 16. In this illustrative embodiment, separate labels are generated that contain the public and private keys 36, 38 used for authentication. Although, in other embodiments, there may also be a single label generated for the public and private keys 36, 38. Finally, one or more processors record the material history that was used in the manufacturing of the product 16. In the illustrative embodiment, a product smart contract is now established by the software 14 and distributed to the blockchain ecosystem 14. This product smart contract contains the provenance of material smart contracts, new public and private keys, and will be available for the end user(s) to view through a mobile device 10 using an inquiry or authentication call.

Now, with reference again to FIGS. 10 and 11, the third illustrative blockchain-based authentication method may further include steps for validating a public transport key to ensure that the user updating the transport details is a valid and authorized user. This important because transport updates will be loaded to the blockchain for the specific material(s) 40 and thus, will be a permanent entry that cannot be reversed. If the transport key 48 is compromised, and the user is not authorized, then there could potentially be invalid entries to the blockchain. If that happens, then the integrity of the material 40 could be compromised. The transport feature is beneficial because it shows the custodianship and transport activities of the material(s) 40 as they make their way to the manufacturer 18 from the supplier 42. Each transporter/shipper 32 has the responsibility to ensure that the material 40 is not compromised and will be accountable because an audit trail will be enforced in the authentication system if the custodian workflow feature or authorized user list is used. In the illustrative embodiment, the transport key 48 is associated with the material 40 at the time of shipment and is associated (i.e., linked) with the private and public authentication keys 44, 46. The transport key 48 can be considered a feature of the application and the supplier 42 may decide to not include it as part of the initial material smart contract.

Initially, with reference to FIG. 10, one or more processors receive a request to generate a transport public key 48 (see FIG. 10) that is to be associated with the material smart contract or other transaction protocol. In the illustrative embodiment, when the material smart contract is established by the supplier 42, a request to generate a transport key 48 will be initiated by the user using an online page. In response to the request, one or more processors generate a transport public key 48 that is configured to be used to track transport and is to be associated with the material 40 using the material smart contract or other transaction protocol. In the illustrative embodiment, upon a request through an online page or interface, the software 12 generates a random transport key 48 that will be associated with the material smart contract. Then, one or more processors provide a transport key label for the supplier 42 for material(s) 40 to be associated with the packaging or shipment container 50 containing the item(s) that will be used for transport. In the illustrative embodiment, by navigating to the create label page in the software 12, a process is selected and initiated to create the corresponding transport key label that will be associated with the packaging or shipping container 50 for the material 40. Then, one or more processors are configured to receive a public inquiry using the transport public key 48 generated for transport. In the illustrative embodiment, an authorized transporter or custodian 32 will use a mobile device 34 with, for example, a QR reader to scan the packaging or shipping container 50 transport key 48 of the material 40. Through software, the transport key 48 along with the shipping details will be transferred to the software 14. After which, one or more processors verify, based on transport public key 48, a look up to the material smart contract or other transaction protocol based on an authorized user and/or registered user 32. In the illustrative embodiment, when the transport key 48 and shipper details message is received by the software 14, the software 14 will validate the user and prepare a message for transport update. One or more processors then generate a decentralized call to validate the transport public key 48. In the illustrative embodiment, through the front-end software accessible using the device 10, a transport message will be sent to the blockchain ecosystem 14 to validate the transport key 48. The blockchain ecosystem 14 verifies a valid transaction based on the transport public key 48 and the material smart contract or other transaction protocol for the supplier material(s) 40. In the illustrative embodiment, based on the transport update message from the front-end software accessible using the device 10, the blockchain ecosystem 14 will validate the transport transaction against the existing material smart contract for the material 40. Then, the blockchain ecosystem servers and processors record an entry to the blockchain ledger or other transaction protocol of transport details. In the illustrative embodiment, once the blockchain ecosystem 14 has validated the transaction, the blockchain ledger will be updated with the shipping details. Finally, one or more processors transmit a verification message to the authorized or registered user 32 regarding the transport update. In the illustrative embodiment, the software 14, from the blockchain ecosystem 14, transmits a response back to the transporter's mobile device 34 with a verification message of the transport update.

Next, with reference again to FIGS. 10 and 11, the third illustrative blockchain-based authentication method may further include steps for allowing a user to make a public inquiry to obtain historical details regarding the material(s) 40. Initially, during the inquiry process, one or more processors receive a public inquiry using the public key 44 generated by the supplier 42, associated to the material(s) 40 or some media. In the illustrative embodiment, an end user may scan the public key label by using a QR reader on a mobile device 10 (e.g., smart phone, tablet, scanner, etc.). This process is driven from the mobile device 10 through the software 14 to the blockchain ecosystem 14 to perform a material smart contract lookup. After which, one or more processors provide historical details of the material(s) 40, including supplier details and transport history. In the illustrative embodiment, the blockchain ecosystem 14 interacts with the software 14 and ultimately the end user's mobile device 10 to supply the end user the initial supplier details as well as any transport updates that may have occurred, without claiming ownership.

It is readily apparent that the aforedescribed blockchain-based authentication system and method offers numerous advantages. In particular, the blockchain-based authentication system and method provides immutable accounting of authenticity, provenance, chain of custody, and ownership for products that is quickly and simply implemented into a wide range of products and services with low impact to existing business processes. The technology uses unique key pairings that cannot be duplicated. These pairings provide 100% authenticity of the product being authenticated.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A method in support of creating public and private keys to be generated to a quick response (QR) code, near field communication (NFC) device, or other identifying media that can be readable, performed by one or more servers, using a decentralized blockchain technology, with the one or more servers being connected to a network and having memory, one or more processors, and one or more code sets stored in the memory and executable in the one or more processors, the method comprising the steps of:
  receiving, by the one or more processors, first product information for a product from a manufacturer to be associated with a QR code, NFC device, or other identifying media;
  allocating, by the one or more processors, a product entry record for the product identified by the manufacturer into a product smart contract or other transaction protocol;
  receiving, by the one or more processors, manufacturing details of the product, the manufacturing details including at least one of a registration key, a serial number, manufacturer identifier, and a place of origin;
  generating, by the one or more processors, a public key and private key associated with the product that are configured to be used by the manufacturer in the authentication of the product managed by the product smart contract or other transaction protocol;
  receiving, by the one or more processors, an authentication pairing of the public key and the private key, both public and private key data for the public key and private key being populated into the product smart contract or other transaction protocol so that the public and private key data in the product smart contract or other transaction protocol is configured to be used for later validation;
  providing, by the one or more processors, the public key and the private key from the manufacturer to be affixed to the same product with some media using the QR code, NFC device, or other identifying media;
  providing, by the one or more processors, a first phase of product ownership assigned to the manufacturer;
  recording, by a blockchain ecosystem, the manufacturing and product details contained within the product smart contract, including an encrypted form of the public key and the private key;
  receiving, at the one or more processors, a private inquiry using the public key and the private key generated by the manufacturer, associated to the product, with an authentication call setting;
  verifying, by the one or more processors, based on the public key and the private key, a look up to the product smart contract or other transaction protocol based on the key pairing provided, both the public and private key being transmitted to the product smart contract or other transaction protocol during verification;
  generating, by the one or more processors, a decentralized call to validate the public key and the private key with both the public and private key data in the product smart contract or other transaction protocol;
  verifying, by the blockchain ecosystem having a blockchain ledger, a valid transaction based on the public key and the private key and the associated product smart contract or other transaction protocol for the manufactured product;
  recording, by the one or more processors, a valid authentication transaction to the blockchain ledger;
  locking, by the one or more processors, the product smart contract or other transaction protocol from any further processing with respect to the product after the valid authentication transaction is recorded so as to prevent any future product authentication for the product;
  transmitting by the one or more processors, a verification message to a claimant of the private key regarding authentication; and
  generating, by the one or more processors, a second phase of product ownership that is allocated to the claimant as the owner of the public and the private key used in authentication.

2. The method according to claim 1, further comprising the steps of:
  receiving, by the one or more processors, a request to generate a transport public key that is to be associated with the product smart contract or other transaction protocol, the transport public key being separate from the public key and the private key paired for authentication;
  generating by the one or more processors, the transport public key that is configured to be used to track transport and is to be associated with the initial authentication pairing keys using the product smart contract or other transaction protocol;
  providing, by the one or more processors, transport key data using a QR code, NFC device, or other identifying media to be associated with the product, product packaging, container containing the product or products, or other package that is configured to be used for transport;
  recording, by the blockchain ecosystem, an encrypted form of the transport key associated with the product smart contract;
  receiving, by the one or more processors, a request from the manufacturer to add a transporter account for an authorized user and/or registered user, and/or a request to add the authorized user and/or registered user to a custodian workflow or authorized user list;

generating by the one or more processors, the transporter account for the authorized user and/or registered user and/or adding the authorized user and/or registered user to the custodian workflow or authorized user list;

receiving, at the one or more processors, a public inquiry using the transport public key generated for transport;

verifying, by the one or more processors, based on the transport public key, a look up to the product smart contract or other transaction protocol based on the authorized user and/or registered user;

generating, by the one or more processors, a decentralized call to validate the transport public key;

verifying, by the blockchain ecosystem, a valid transaction based on the transport public key and the product smart contract or other transaction protocol for the manufactured product;

recording, by the one or more processors, an entry of transport details to the blockchain ledger; and transmitting by the one or more processors, a verification message to the authorized or registered user regarding the transport update.

3. The method according to claim 1, further comprising the steps of:

receiving, at the one or more processors, a public inquiry using the public key and private key generated by the manufacturer, associated with the product, with an inquiry call setting; and providing, by the one or more processors, historical details of the product, including manufacturing details and transport history.

4. The method of claim 1, wherein the public key and the private key are affixed to the product within a single QR code.

5. The method of claim 1, wherein receiving the private inquiry comprises receiving the public key and the private key.

6. The method of claim 1, wherein the public key and the private key are affixed to the product within a single QR code, NFC device, or other identifying media.

7. The method according to claim 1, further comprising the step of:

providing, by the one or more processors, an ability to create a new public key and private key that is to be used in authentication if ownership is transferred in the future.

8. A method in support of creating public and private keys to be generated to a quick response (QR) code, near field communication (NFC) device, or other identifying media that can be readable, performed by one or more servers, using a decentralized blockchain technology, with the one or more servers being connected to a network and having a memory, one or more processors, and one or more code sets stored in the memory and executable in the one or more processors, the method comprising the steps of:

receiving, at the one or more processors, first product information for a product from a manufacturer to be associated with a QR code, NFC device, or other identifying media;

allocating, by the one or more processors, a product entry record for the product identified by the manufacturer into a product smart contract or other transaction protocol;

receiving, at the one or more processors, manufacturing details of a product, the manufacturing details including at least one of registration key, a serial number, manufacturer identifier, and a place of origin;

generating, by the one or more processors, a public key and a private key associated with the product that are configured to be used together by the manufacturer in the authentication of a product managed by the product smart contract or other transaction protocol;

receiving, at the one or more processors, the public key generated by the manufacturer, associated to the product, public key data for the public key being populated into the product smart contract or other transaction protocol so that the public key data in the product smart contract or other transaction protocol is configured to be used for later validation;

receiving, at the one or more processors, the private key generated by the manufacturer, associated with the product which is stored hidden with the product and is configured to be accessible by the consumer after purchasing the product, on the QR code, NFC device, or other identifying media, private key data for the private key being populated into the product smart contract or other transaction protocol so that the private key data in the product smart contract or other transaction protocol is configured to be used for later validation;

providing, by the one or more processors, the public key and the private key from the manufacturer to be affixed to the same product with some media using the QR code, NFC device, or other identifying media;

providing, by the one or more processors, a first phase of product ownership assigned to the manufacturer;

recording, by a blockchain ecosystem, the manufacturing and product details contained within the product smart contract, including an encrypted form of the public key and the private key;

receiving, at the one or more processors, a private inquiry using the public key and the private key generated, associated with the product, by the manufacturer for authentication;

verifying, by the one or more processors, based on the public key and the private key pairing, a look up to the product smart contract or other transaction protocol based on the key pairings provided, both the public and private key being transmitted to the product smart contract or other transaction protocol during verification;

generating, by the one or more processors, a decentralized call to validate the public key and the private key pairing with both the public and private key data in the product smart contract or other transaction protocol;

verifying, by the blockchain ecosystem, a valid transaction based on the public key and the private key associated with the product smart contract or other transaction protocol for the manufactured product;

recording, by the one or more processors, a valid authentication transaction to the blockchain ledger;

locking, by the one or more processors, the product smart contract or other transaction protocol from any further processing with respect to the product after the valid authentication transaction is recorded so as to prevent any future product authentication for the product;

transmitting by the one or more processors, a verification message to a claimant of the public key and the private key regarding authentication; and generating, by the one or more processors, a second phase of product ownership that is allocated to the claimant as the owner of the public key and the private key used in authentication.

9. The method according to claim 8, further comprising the step of:
  providing, by the one or more processors, an ability to create a new public key and private key that is to be used in authentication if ownership is transferred in the future.

10. The method according to claim 8, further comprising the steps of:
  receiving, at the one or more processors, a request to generate a transport public key that is to be associated with the product smart contract or other transaction protocol, the transport public key being separate from the public key and the private key paired for authentication;
  generating, by the one or more processors, the transport public key that is configured to be used to track transport and is to be associated with the initial authentication pairing using the product smart contract or other transaction protocol;
  providing, by the one or more processors, transport key data using the QR code, NFC device, or other identifying media, to be associated with the product, product packaging, or container containing the product or products, or other package that is configured to be used for transport;
  recording, by the blockchain ecosystem, an encrypted form of the transport key associated with the product smart contract;
  receiving, by the one or more processors, a request from the manufacturer to add a transporter account for an authorized user and/or registered user, and/or a request to add the authorized user and/or registered user to a custodian workflow or authorized user list;
  generating by the one or more processors, the transporter account for the authorized user and/or registered user and/or adding the authorized user and/or registered user to the custodian workflow or authorized user list;
  receiving, at the one or more processors, a public inquiry using the transport public key generated for transport;
  verifying, by the one or more processors, based on the transport public key, a look up to the product smart contract or other transaction protocol based on the authorized user and/or registered user;
  generating, by the one or more processors, a decentralized call to validate the transport public key;
  verifying, by the blockchain ecosystem, a valid transaction based on the transport public key and the product smart contract or other transaction protocol for the manufactured product;
  recording, by the one or more processors, an entry of transport details to the blockchain ledger; and
  transmitting by the one or more processors, a verification message to the authorized or registered user regarding the transport update.

11. The method according to claim 8, further comprising the steps of:
  receiving, at the one or more processors, an inquiry using the product public key to view manufacturing details and transport transactions; and
  providing, by the one or more processors, historical details of the product, including manufacturing details and transport history.

12. The method of claim 8, wherein the public key is associated with the product in a first QR code and the private key is affixed to the product in a second QR code.

13. The method of claim 8, wherein the public key is affixed to an outer surface of the product and the private key is affixed inside the product.

14. The method of claim 8, wherein receiving the private inquiry comprises:
  receiving, by the one or more processors from a user device, a first message containing the private key;
  in response to receiving the first message, transmitting, by the one or more processors to the user device, a second message requesting the public key corresponding to the private key; and
  receiving, by the one or more processors from the user device, a third message containing the public key.

15. The method of claim 14, comprising the step of:
  authenticating the product based on the private key and the public key matching the public key data and private key data in the smart contract.

16. The method of claim 8, wherein the public key is associated with the product in a first QR code, NFC device, or other identifying media and the private key is affixed to the product in a second QR code, NFC device, or other identifying media.

17. A method in support of creating public and private keys to be generated to a quick response (QR) code, near field communication (NFC) device, or other identifying media that can be readable, performed by one or more servers, using a decentralized blockchain technology, with the one or more servers being connected to a network and having a memory, one or more processors, and one or more code sets stored in the memory and executable in the one or more processors, the method comprising the steps of:
  receiving, by the one or more processors, a material to be associated with a QR code, NFC device, or other identifying media;
  allocating, by the one or more processors, a material entry record for the material identified by a supplier into a material smart contract or other transaction protocol;
  generating, by the one or more processors, a public key and private key associated with the material that are configured to be used by the supplier and a manufacturer managed by the material smart contract or other transaction protocol;
  receiving, by the one or more processors, an authentication pairing of the public key and the private key, both public and private key data for the public key and private key being populated into the material smart contract or other transaction protocol so that the public and private key data in the material smart contract or other transaction protocol is configured to be used for later validation;
  providing, by the one or more processors, the public key and the private key from the supplier to be affixed to the material using the QR code, NFC device, or other identifying media;
  providing, by the one or more processors, a first phase of material ownership assigned to the supplier;
  recording, by a blockchain ecosystem, the supplier and material details contained within the material smart contract, including an encrypted form of the public key and the private key;
  receiving, by the one or more processors, a public key and private key pairing that is configured to be utilized by the manufacturer to claim supplier materials;
  verifying, by the blockchain ecosystem, a valid transaction based on the public and private key associated with the material smart contract or other transaction protocol for supplier materials;

providing, by the one or more processors, a second phase of material ownership assigned to the manufacturer;

recording, by the one or more processors, supplier material into a single or multiple batch of materials that is configured to be used in the manufacturing of a product;

receiving, by the one or more processors, a new request by the manufacturer to combine or associate one or more supplier smart contract blockchain ledger details into the manufacturer's product smart contract or other transaction protocol;

verifying, by the blockchain ecosystem, an accounting of supplier material smart contracts into a consolidated product smart contract for the manufacturer authentication keys;

generating, by the one or more processors, an additional public key and private key associated with the product that is configured to be used by the manufacturer in the authentication of an item managed by a product smart contract or other transaction protocol;

receiving, by the one or more processors, an authentication pairing of the additional public key and the private key to be affixed to the same product with some media using a QR code, NFC device, or other identifying media;

providing, by the one or more processors, the authentication pairing of the additional public key and the private key from the manufacturer to be associated with the product; and recording, by the one or more processors, the material history that was used in the manufacturing of a product.

18. The method according to claim 17, further comprising the steps of:

receiving by the one or more processors, a request to generate a transport public key that is configured to be used to track transport and is configured to be associated with the initial authentication pairing keys using the material smart contract or other transaction protocol, the transport public key being separate from the public key and the private key paired for authentication;

generating, by the one or more processors, the transport public key that is configured to be used to track transport and is to be associated with the initial authentication pairing using the material smart contract or other transaction protocol;

providing, by the one or more processors, transport key data using the QR code, NFC device, or other identifying media, to be associated with the material or container containing the material or materials, or other package that will be used for transport;

recording, by the blockchain ecosystem, the supplier and material details contained within the material smart contract, including an encrypted form of the transport key;

receiving, by the one or more processors, a request from the manufacturer or supplier to add a transporter account for an authorized user and/or registered user, and/or a request to add the authorized user and/or registered user to a custodian workflow or authorized user list;

generating by the one or more processors, the transporter account for the authorized user and/or registered user and/or adding the authorized user and/or registered user to the custodian workflow or authorized user list;

receiving, at the one or more processors, a public inquiry using the transport public key generated for transport;

verifying, by the one or more processors, based on the transport public key, a look up to the material smart contract or other transaction protocol based on the authorized user and/or registered user;

generating, by the one or more processors, a decentralized call to validate the transport public key;

verifying, by the blockchain ecosystem, a valid transaction based on the transport public key and the material smart contract or other transaction protocol for a supplier's material;

recording, by the one or more processors, an entry to the material smart contract or other transaction protocol of transport details; and transmitting, by the one or more processors, a verification message to the authorized or registered user regarding the transport update.

* * * * *